(12) United States Patent
Chiu et al.

(10) Patent No.: US 10,284,395 B2
(45) Date of Patent: May 7, 2019

(54) TIME-BASED DECISION FEEDBACK EQUALIZATION

(71) Applicant: Regents of the University of Minnesota, Minneapolis, MN (US)

(72) Inventors: Po-Wei Chiu, Minneapolis, MN (US); Somnath Kundu, Hillsboro, OR (US); Hyung-il Kim, Woodbury, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 15/806,901

(22) Filed: Nov. 8, 2017

(65) Prior Publication Data

US 2018/0351770 A1 Dec. 6, 2018

Related U.S. Application Data

(60) Provisional application No. 62/514,424, filed on Jun. 2, 2017.

(51) Int. Cl.
*H04L 7/00* (2006.01)
*H04L 25/03* (2006.01)

(52) U.S. Cl.
CPC ...... *H04L 25/03057* (2013.01); *H04L 7/0041* (2013.01); *H04L 7/0087* (2013.01); *H04L 25/03031* (2013.01); *H04L 2025/03471* (2013.01); *H04L 2025/03783* (2013.01)

(58) Field of Classification Search
USPC ...................................................... 375/233
See application file for complete search history.

(56) References Cited

U.S. PATENT DOCUMENTS

| 5,268,930 | A | 12/1993 | Sendyk et al. |
| 8,593,305 | B1 * | 11/2013 | Tajalli ................ H04L 1/0048 341/58 |
| 2002/0060820 | A1 | 5/2002 | Buchali |
| 2010/0046598 | A1 * | 2/2010 | Zhong ............ H04L 25/03038 375/233 |

(Continued)

OTHER PUBLICATIONS

Balan et al.,. "A 4.8-6.4-Gb/s Serial Link for Backplane Applications Using Decision Feedback Equalization," IEEE Journal of Solid-State Circuits, vol. 40, No. 9, Sep. 2005, 11 pp.

(Continued)

*Primary Examiner* — Eva Y Puente
(74) *Attorney, Agent, or Firm* — Shumaker & Sieffert, P.A.

(57) ABSTRACT

A time-based decision feedback equalizer (TB-DFE) circuit may include a voltage-to-time converter configured to convert a communication signal into a time-based signal. A timing of when an edge of the time-based signal occurs is indicative of a voltage level of the communication signal. The circuit may include a plurality of delay circuits arranged to process the time-based signal in series to generate a delay data signal. The delay circuits may adjust the timing of when the edge of the time-based signal occurs, and a corresponding time delay introduced by each of the delay circuits may be based on a respective weighting factor applied to one or more samples of an output digital signal previously generated by the TB-DFE circuit. A phase detector may compare a timing of an edge of the delay data signal with a reference clock signal and generate the output digital signal based on the comparison.

21 Claims, 15 Drawing Sheets

(56) References Cited

U.S. PATENT DOCUMENTS

| | | | | |
|---|---|---|---|---|
| 2010/0150221 A1* | 6/2010 | Jenkins | ............. | H04L 25/03057 375/233 |
| 2012/0057627 A1* | 3/2012 | Chan | ................. | H04L 25/03057 375/233 |
| 2015/0333937 A1* | 11/2015 | Kusumoto | ........ | H04L 25/03057 375/233 |

OTHER PUBLICATIONS

Bashirullah et al., "Current-Mode Signaling in Deep Submicrometer Global Interconnects," IEEE Transactions on Very Large Scale Integration (VLSI) Systems, vol. 11, No. 3, Jun. 2003, 12 pp.

Chen et al., "A Low-PDP and Low-Area Repeater Using Passive CTLE for On-Chip Interconnects," 2015 Symposium on VLSI Circuits Digest of Technical Papers, Jun. 17-19, 2015, 2 pp.

Cong., "An Interconnect-Centric Design Flow for Nanometer Technologies," IEEE, Apr. 2001, 7 pp.

Gondi et al., "A 10Gb/s CMOS Adaptive Equalizer for Backplane Applications ," IEEE Solid-State Conference, Feb. 10, 2005, 3 pp.

Horowitz et al., "The Future of Wires," IEEE, vol. 89, Issue 4, Apr. 2001, 16 pp.

Ismail et al., "Effects of Inductance on the Propagation Delay and Repeater Insertion in VLSI Circuits: A Summary," IEEE, Circuits and systems Magazine, Sep. 8, 2003, 5 pp.

Jose et al., "Pulsed Current-Mode Signaling for Nearly Speed-of-Light Intrachip Communication," IEEE Journal of Solid-State Circuits, vol. 41, No. 4, Apr. 2006, 9 pp.

Kim et al., "A 4Gb/s/ch 356fJ/b 10mm Equalized On-chip Interconnect with Nonlinear Charge-Injecting Transmit Filter and Transimpedance Receiver in 90nm CMOS," IEEE Solid-State Circuits Conference, Feb. 8-12, 2009, 4 pp.

Koon-Lun et al., "A Serial-Link Transceiver with Transition Equalization," IEEE International Solid-State Circuits Conference, Feb. 6-9, 2006, 10 pp.

Kossel et al., "A T-Coil-Enhanced 8.5Gb/s High-Swing Source-Series-Terminated Transmitter in 65nm Bulk CMOS," IEEE International Solid-State Circuits Conference, Feb. 3-7, 2008, 3 pp.

Kundu et al., "A 0.2-1.45-GHz Subsampling Fractional-N Digital MDLL with Zero-Offset Aperture PD-Based Spur Cancellation and In Situ Static Phase Offset Detection," IEEE Journal of Solid-State Circuits, vol. 52, No. 3, Mar. 2017, 13 pp.

Larsson-Edefors, "Investigation on Maximal Throughput of a CMOS Repeater Chain," IEEE Transactions on Circuits and Systems-I Fundamental Theory and Applications, No. 47, No. 4, Apr. 2000, 5 pp.

Lee et al., "A 95fJ/b Current-Mode Transceiver for 10mm On-Chip Interconnect," IEEE Conference on Solid-State Circuits, Feb. 17-21, 2013, 3 pp.

Schinkel et al., "A 3-Gb/s/ch Transceiver for 10-mm Uninterrupted RC-Limited Global On-Chip Interconnects," IEEE Journal of Solid-State Circuits, vol. 41, No. 1, Jan. 2006, 10 pp.

Seo et al., "High-Bandwidth and Low-Energy On-Chip Signaling with Adaptive Pre-Emphasis in 90nm CMOS," ISSCC 2010, Session 9, IEEE Conference on Solid-State Circuits, Feb. 7-11, 2010, 3 pp.

Song et al., "1V 10Gb/s/pin Single-Ended Transceiver with Controllable Active-Inductor-Based Driver and Adaptively Calibrated Cascade-DFE for Post-LPDDR4 Interfaces," IEEE Solid-State Circuits Conference, Feb. 22-26, 2015, 3 pp.

Walter et al., "A Source-Synchronous 90Gb/s Capacitively Driven Serial On-Chip Link OVer 6mm in 65nm CMOS," ISSCC 2012, Session 10, IEEE International Solid-State Circuits Conference, Feb. 21, 2012, 3 pp.

Wang et al., "A 21-Gb/s 87-mW Transceiver with FFE/DFE/Linear Equalizer in 65-nm CMOS Technology," Symposium on VLSI Circuits Digest of Technical Papers, Jun. 16-18, 2009, 2 pp.

Yi et al., "A Time-Based Receiver with 2-tap DFE for a 12Gb/s/pin Single-Ended Transceiver of Mobile DRAM Interface in 0.8V 65nm CMOS," IEEE Solid-State Circuits Conference, Feb. 5-9, 2017, 3 pp.

Zhang et al., A 32Gb/s On-chip Bus with Driver Pre-emphasis Signaling, IEEE Custom Intergrated Circuits Conference, Sep. 10-13, 2006, 4 pp.

Yi et al., "A Time-Based Receiver with 2-tap DFE for a 12Gb/s/pin Single-Ended Transceiver of Mobile DRAM Interface in 0.8V 65nm CMOS," IEEE Solid-State Circuits Conference, Feb. 2017, 39 pp.

\* cited by examiner

|  | ISSCC'09 [14] | ISSCC'10 [15] | ISSCC'12 [16] | ISSCC'13 [17] | VLSI'15 [8] | This disclosure |
|---|---|---|---|---|---|---|
| Technology | 90nm | 90nm | 65nm | 65nm | 65nm | 65nm |
| TX and RX | Charge Injection FFE+TIA | Capacitively driven | Capacitively driven+sense amp. | Current mode transceiver | CTLE-based repeater | Voltage mode driver+TIA |
| Features | No DFE | No DFE | No DFE | No DFE | No DFE | 2-tap TB-DFE |
| Data Rate | 4Gb/s | 4.9Gb/s | 10Gb/s | 3Gb/s | 4Gb/s | 10Gb/s |
| Throughput (Gb/s/μm) | 2 | 4.4 | 2.56 | 0.75 | 4 | 2 |
| Link Length | 10mm | 5mm | 6mm | 10mm | 2.5mm+2.5mm | 10mm |
| BER Bathtub | <10E-6 | <10E-10 | <10E-12 | <10E-12 | <10E-12 | <10E-12 |
| BER Eye | Yes (<10E-6) | No | No | Yes (<10E-12) | No | Yes (<10E-11) |
| Eye Width | 0.5UI* @BER=10E-6 | N/A | N/A | 0.48UI* @BER=10E-12 | 0.48UI** @BER=10E-12 | 0.43UI** @BER=10E-12 |
| Energy Efficiency (fJ/b/mm) | 35.6 | 68 | 174 | 9.5 | 48.4 | TIA 14.4 / DFE 30.9 / FFE 31.9 |

*Eye width  **Bathtub width

FIG. 22

TIME-BASED DECISION FEEDBACK EQUALIZATION

This application claims the benefit of U.S. Provisional Patent Application No. 62/514,424, filed Jun. 2, 2017, the entire content of which is incorporated by reference herein.

GOVERNMENT INTEREST

This invention was made with government support under CCF-1255937awarded by the National Science Foundation. The government has certain rights in the invention.

TECHNICAL FIELD

The disclosure relates to electronic signal communications and, for example, high-speed serial communication.

BACKGROUND

Most integrated circuits (ICs) include on-chip circuits that transmit data to one another via data buses. The data rate at which a transmitter can transmit data to a receiver within the IC may be limited by the capabilities of the data buses. For example, the resistance and capacitance of the data bus negatively impacts the fidelity of the data signal transmitted by the transmitter, and if the resistance and/or capacitance is high enough, the receiver cannot reconstruct the transmitted data signal without a bit-error-rate (BER) that is too high.

SUMMARY

This disclosure describes time-based decision feedback equalizer (TB-DFE) circuits for communication systems. As described herein, example implementations of the TB-DFE circuits perform weighted sum filter operations in the time domain using inverters and digitally-controlled delay elements. The techniques may advantageously be applied to improve communications, such as high-speed on-chip communications within an integrated circuit or chip-to-chip interfaces. Moreover, the techniques enable equalization circuits that can readily scale and make use of digital circuit technologies.

For example, this disclosure describes decision feedback equalizer (DFE) circuits configured to compensate signal degradation in a transmitted digital signal, such as a high-speed, on-chip serial communication. In one example implementation, the DFE circuit converts an input communication signal into a time-based signal, and adjusts an edge (e.g., rising or falling edge) of the time-based signal based on feedback of weighted previous samples of an output digital signal (e.g., equalized communication signal) of the DFE circuit. The feedback of the weighted previous samples of the output digital signal controls the timing of when an edge of the time-based signal occurs such that there is greater margin for a phase-detector to determine whether an edge of the adjusted time-based signal occurred before or after a reference clock signal.

In general, the determination of whether the edge of the adjusted time-based signal occurred before or after the reference clock signal is indicative of whether the voltage signal was a logic zero or logic one. By increasing the margin for the phase-detector to determine whether the edge of the adjusted time-based signal is before or after edge of the reference clock signal, the DFE circuit compensates for the signal degradation, and increases the likelihood that the phase-detector outputs the output digital signal that is substantially the same as the input digital signal without the signal degradation.

In one example, the disclosure describes a time-based decision feedback equalizer (TB-DFE) circuit comprising a voltage-to-time converter configured to convert a communication signal into a time-based signal, wherein a timing of when an edge of the time-based signal occurs is indicative of a voltage level of the communication signal, a plurality of delay circuits arranged to process the time-based signal in series to generate a delay data signal, wherein the delay circuits are configured to adjust the timing of when the edge of the time-based signal occurs, and wherein a corresponding time delay introduced by each of the delay circuits is configured based on a respective weighting factor applied to one or more samples of an output digital signal previously generated by the TB-DFE circuit, and a phase detector configured to compare a timing of an edge of the delay data signal with a reference clock signal and generate the output digital signal based on the comparison.

In one example, the disclosure describes a method for performing time-based decision feedback equalization, the method comprising receiving, with a time-based decision feedback equalizer (TB-DFE) circuit, a communication signal, converting, with the TB-DFE circuit, the communication signal into a time-based signal, wherein a timing of when an edge of the time-based signal occurs is indicative of a voltage level of the communication signal, adjusting, with the TB-DFE circuit, the timing of when the edge of the time-based signal occurs with a plurality of delay circuits arranged to process the time-based signal in series to generate a delay data signal, wherein a corresponding time delay introduced by each of the delay circuits is configured based on a respective weighting factor applied to one or more samples of an output digital signal previously generated by the TB-DFE circuit, comparing a timing of an edge of the delay data signal with a reference clock signal, and generating the output digital signal based on the comparison.

In one example, the disclosure describes a circuit chip comprising a transmitter circuit configured to output a digital communication signal, a serial link configured to transmit the digital communication signal from the transmitter to a receiver circuit that is on-chip with the transmitter circuit, a time-based decision feedback equalizer (TB-DFE) circuit coupled to the serial link and configured to receive the transmitted digital communication signal as an input communication signal having inter-symbol interference (ISI) introduced by transmission over the data line, and a phase detector. The TB-DFE circuit comprises a voltage-to-time converter configured to convert the input communication signal having the ISI into a time-based signal, wherein a timing of when an edge of the time-based signal occurs is indicative of a voltage level of the input communication signal having the ISI, and a plurality of delay circuits arranged to process the time-based signal in series to generate a delay data signal, wherein the delay circuits are configured to adjust the timing of when the edge of the time-based signal occurs, and wherein a corresponding time delay introduced by each of the delay circuits is configured based on a respective weighting factor applied to one or more samples of an equalized communication signal generated by the TB-DFE circuit. The phase detector is configured to compare a timing of an edge the delay data signal with a reference clock signal and generate, based on the comparison, the equalized communication signal, wherein the equalized communication signal is substantially similar to the transmitted digital communication signal without at least some of the ISI of the input communication signal.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIG. 22 is a table that provides comparison with previous on-chip serial links.

DETAILED DESCRIPTION

In general, decision feedback equalizer (DFE) is a component of high-speed serial links for reducing noise caused by inter-symbol interference (ISI) and improving communication speed. In DFE, the signal-to-noise ratio is improved by using the signal's pervious bits to cancel out the ISI noise in the current incoming bit. There are certain challenges in existing DFE technologies. First, current DFE techniques usually use voltage-based schemes which consume relatively high power, and are unreliable at low supply voltages. Second, they often use complex "CML" analog circuits that occupy a large area, preventing them from being incorporated into on-chip serial links or other advanced technologies. Moreover, as the number of taps increases, the parasitic capacitance of CML circuits may also increase, causing bandwidth to suffer.

This disclosure describes time-based (TB) DFE techniques (e.g., signal equalization) leveraging digital circuits, where a weighted-sum noise-filtering operation may be performed entirely in the time domain rather than the voltage domain. In the described example circuits, an input voltage signal is first converted to a time delay using a voltage-to-time converter stage. Then the signal equalization is performed in the time domain by adding the time delay to the weighted sum of the signal's previous binary outputs. By utilizing digital inverters and digitally-controlled delay elements, this implementation does not consume static power, and the techniques described herein can significantly reduce the necessary complexity of the DFE circuit, making it highly compatible with the scaling of new and advanced technologies. Another advantage of the various TB-DFE implementations described herein is that a higher number of taps can be incorporated by simply adding more delay stages. Also, the inverter-based implementation significantly reduces the circuit complexity and makes it easier to re-design the DFE circuit in a new technology.

The example time-based DFE implementations described herein can be used to reduce the power consumption and design complexity of future high-speed chip-to-chip or on-chip signal interfaces. The example time-based DFE techniques may also be applicable to off-chip serial links which typically have higher channel losses. As another example, the example time-based DFE techniques may be applicable to a time amplifier and time-to-digital converter to achieve an even higher communication speed.

Figure 1:
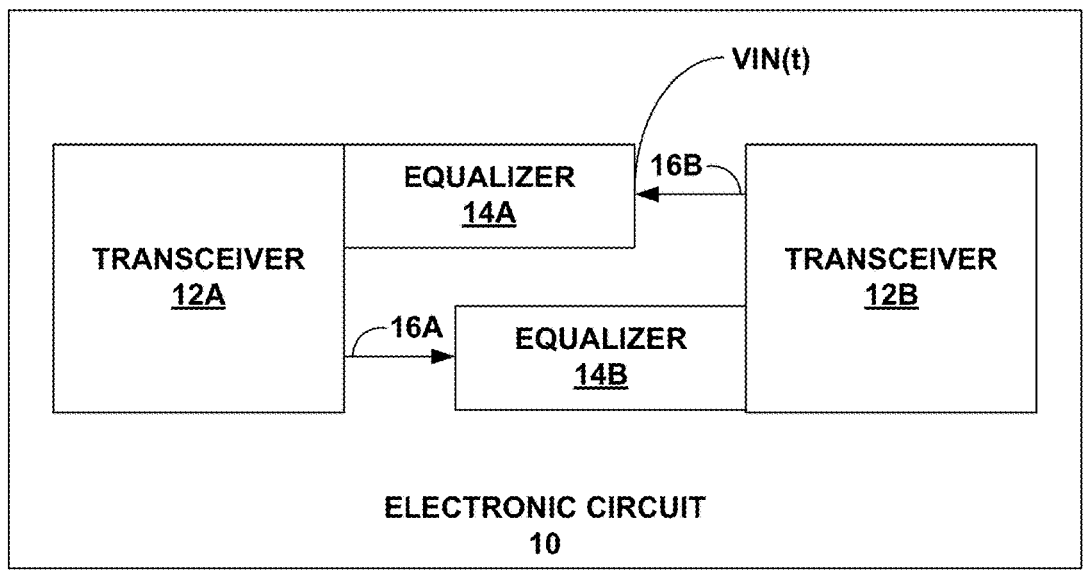
FIG. 1 is a block diagram illustrating an electronic circuit in accordance with one or more examples described in this disclosure.

FIG. 1 is a block diagram illustrating electronic circuit 10 in accordance with one or more examples described in this disclosure. In one example, electronic circuit 10 comprises an integrated circuit (IC) chip that includes transceiver 12A, transceiver 12B, equalizer 14A, equalizer 14B, data line 16A, and data line 16B. In this example, transceivers 12 communicate via internal, high-speed on-chip serial data lines (e.g., serial links) such as data lines 16A, 16B. However, other examples of electronic circuit 10 are contemplated. For instance, electronic circuit 10 may be implemented using multiple integrated circuits. For example, transceiver 12A and equalizer 14A may be located within a first IC chip, and transceiver 12B and equalizer 14B may be located in a second IC chip. In this example, the first IC chip and the second IC chip transmit and receive data to and from each other via data lines 16A and 16B as external transmission lines. For ease of description, the examples are described with respect to electronic circuit 10 being a single IC chip, but the techniques are extendable to other examples that use equalizer circuits such as equalizer 14A and/or equalizer 14B.

Furthermore, although illustrated as separate components, equalizer 14A may be part of transceiver 12A, and equalizer 14B may be part of transceiver 12B. For instance, equalizer 14A may form part of the input circuit block of transceiver 12A, and equalizer 14B may form part of the input circuit block of transceiver 12B. For ease, equalizers 14A and 14B are illustrated as being separate from transceivers 12A and 12B, respectively, but may be part of transceivers 12A and 12B, respectively.

As one example, electronic circuit 10 may be built on a 65 nano-meter (nm) process, and transceiver 12A and transceiver 12B may be configured to transmit and receive data at relatively high data rates (e.g., 10 giga-bits per second (Gbps)). One example of transceiver 12A is a processing core of electronic circuit 10, and one example of transceiver 12B is a local cache memory of electronic circuit in examples where electronic circuit 10 is a processing chip. As another example, transceiver 12A may be a limiting amplifier or automatic gain control (AGC) amplifier, and transceiver 12B may be a clock-and-data recovery (CDR) circuit. In this example, transceiver 12B may not transmit data back to transceiver 12A. As another example, transceiver 12A may be a first arithmetic logic unit (ALU), and transceiver 12B may be a second ALU. In this example, transceiver 12B may not need to transmit data back to transceiver 12A.

Other examples of transceivers 12A and 12B are possible. In general, the example techniques may be applicable to circuits where a first circuit is to transmit data to a second circuit at a relatively high data rate across a high-speed data line (e.g., high-speed on-ship serial links).

As illustrated, transceivers 12A and 12B transmit and receive data via data lines 16A and 16B. Data lines 16A and 16B, which may be part of on-chip data buses, may be relatively short (e.g., approximately 10 milli-meter (mm)). In examples where transceivers 12A and 12B are on different IC chips, data lines 16A and 16B may be longer (e.g., in the order of 50 mm or greater). The electrical characteristics (e.g., bandwidth) of data lines 16A and 16B may negatively impact the integrity of the data transmitted between transceivers 12A and 12B at the relatively high data rates even though data lines 16A and 16B are relatively short.

On chip buses (e.g., of which data lines 16A and 16B are a part) may be performance-critical circuits in modern processor systems (e.g., electronic circuit 10) as they are responsible for transferring massive amount of data between various processing units and cache blocks at gigahertz frequencies (e.g., between transceivers 12A and 12B). Despite the aggressive pace of transistor scaling, interconnect speed and interconnect power have not scaled proportionally due to large resistor-capacitor (RC) parasitics (e.g., the electrical characteristics of data lines 16A and 16B), large die size of electronic circuit 10, increasing number of processing units, and higher operating frequencies. When the data rate of data transmitted between transceivers 12A and 12B exceeds the RC time constant of an interconnect wire (e.g., data lines 16A and 16B), significant inter-symbol-interference (ISI) may occur, where the ISI is an example of the negative impact on the integrity of the transmitted data.

For instance, transceiver 12A transmits a digital voltage signal (e.g., bitstream of logic ones and logic zeros) via data line 16A. Accordingly, data line 16A may be serial link that transmits data one-bit at a time. Although the examples are described with respect to a serial link, the techniques may be applicable to parallel links as well. Data line 16A corrupts the digital voltage signal (e.g., with ISI) such that transceiver 12B, by itself, cannot resolve between a logic one (e.g., voltage above a threshold) and a logic zero (e.g., voltage below a threshold). For instance, the ISI may cause a logic one to not reach a sufficiently high voltage level causing transceiver 12B to determine that a logic zero was transmitted.

One example way to overcome the impacts of ISI is to boost the amplitude of the outputs for transceivers 12A and 12B. However, due to the longer interconnect length of data lines 16A and 16B, and the high operating frequency, interconnect power (e.g., the power needed to ensure that the amplitude is sufficiently high to overcome the ISI) may be a significant portion of the total chip power consumption.

Another way to compensate for the ISI is with repeater circuits along the path of data lines 16A and 16B. Accordingly, a simple solution to overcome the interconnect bottleneck is adding repeater circuits to break up a long wire into shorter segments which enhances the overall latency and throughput of the channel (e.g., data lines 16A and 16B). Use of repeaters is effective and relatively straightforward to implement as synthesis tools support automated buffer insertion. However, tools may not be able to place repeaters at their desired locations due to large functional blocks underneath the interconnect path. Signals may have to be rerouted or the chip floorplan may have to be disrupted to accommodate repeaters. This may result in additional design time, loss in performance, and increased power consumption due to redundant repeaters.

Recently, serial links, which are an example of data lines 16A and 16B, have been gaining popularity for on-chip point-to-point applications as they can achieve 10 Gbps or higher data rates with high power efficiency without disrupting the chip floorplan. Many serial links employ low-swing signaling which can lower the power consumption but requires sophisticated transmitter (TX) and receiver (RX) circuits (e.g., transceivers 12A and 12B).

In accordance with the techniques described in this disclosure, one example way to address the ISI is with equalizer 14A and equalizer 14B. As illustrated, equalizer 14B may receive a communication signal having the ISI from data line 16A as an input voltage signal, compensate for the ISI, and generate an output voltage signal (e.g., equalized communication signal) that is substantially the same as the communication signal (e.g., the input voltage signal without the ISI). Equalizer 14B may be coupled, with very little distance, to the input of transceiver 12B such that there is little to no degradation in the signal between the output of equalizer 14B and the input of transceiver 12B. Similarly, transceiver 12B transmits a communication signal, data line 16B adds ISI, equalizer 14A compensates for the ISI, and outputs a voltage signal (e.g., equalized communication signal) that is substantially similar to the communication signal that transceiver 12B outputted to transceiver 12A.

The example techniques are described with respect to data lines 16A and 16B being high-speed, on-chip serial links (e.g., data bits are transmitted one at a time). However, the examples may be applicable to parallel links as well, where each of the parallel links includes an equalizer like equalizers 14. For instance, where data is transmitted in a parallel fashion, but at a relatively high data rate, equalizers 14 may be utilized to compensate for the ISI.

Although one equalizer 14A between transceiver 12A and transceiver 12B is illustrated, and one equalizer 14B between transceiver 12B and transceiver 12A is illustrated, the examples are not so limited. In some examples, there may be a plurality of equalizers, similar to equalizers 14A and 14B, along data lines 16A and 16B. For instance, if data lines 16A and 16B are relatively long, there may be intermediate equalizers 14A and 14B to compensate for the ISI. In some examples, equalizers 14A and 14B may be sufficiently small that extensive rerouting of data buses is not needed on electronic circuit 10, at least as compared to the use of repeaters described above.

Equalization techniques such as feedforward equalizer (FFE), continuous time linear equalizer (CTLE), and decision feedback equalizer (DFE) have been used for off-chip serial link applications. FFE is a technique implemented in the transmitter block of transceiver 12A or 12B to pre-distort the signal to compensate for the channel loss (e.g., negative impact of data lines 16A and 16B).

CTLE and DFE are implemented in the receiver block (e.g., at the input of transceiver 12A and transceiver 12B with equalizer 14A and 14B, respectively). CTLE is basically an amplifier which provides a peaking gain to the signal frequency of interest.

DFE, on the other hand, is used to cancel ISI noise in the incoming data stream by subtracting the ISI component estimated based on the preceding bits and proper weights. The number of preceding bits and the weight values for the DFE filter are determined by the channel characteristics (e.g., electrical characteristics of data lines 16A and 16B). In general, a channel with high loss requires a longer DFE filter.

Some techniques may use equalization to improve the communication speed and energy-efficiency of on-chip serial links. For example, a charge-injection based FFE where capacitive coupling is used to pre-distort the transmit signal may be used. In another example, a current mode transceiver with a pre-emphasis driver and an active inductor may be used. However, these on-chip serial links incorporate a complex analog-intensive design style which suffers from headroom issues and process-voltage-temperature effects. Moreover, such analog-intensive circuits do not take full advantage of the technology scaling benefits and require considerable re-design effort in every new technology. For instance, recent examples include charge-injection based feedforward equalization, capacitive based de-emphasis, and current mode transceiver with active inductor. However, these analog-intensive approaches are susceptible to PVT variation and suffer from headroom issues at low operating voltages. Moreover, they do not take full advantage of the technology scaling benefits and require considerable design effort to implement in a new technology.

For current mode logic (CML) circuits, which are generally used on on-chip circuits, DFE techniques may not have been possible due to the complicated circuit design and large power overhead of CML. However, this disclosure describes example DFE techniques that may be useable in on-chip circuits. For example, equalizers 14A and 14B may be configured to perform the example DFE techniques described in this disclosure. Again, although the example techniques are described with respect to transceivers 12A and 12B and equalizers 14A and 14B all being on the same chip, the techniques are not limited to such examples.

In examples described in this disclosure, equalizers 14A and 14B may perform a time-based DFE (TB-DFE) technique, where the DFE operation is performed entirely in the time domain using digital circuits (e.g., inverters, logic gates, flip-flops, and the like). Equalizers 14A and 14B are examples of a digital intensive design of time-based DFE utilizing inverters and digitally-controlled delay elements that can be easily developed. Another advantage of the TB-DFE is that higher number of taps can be incorporated into equalizes 14A and 14B by simply adding more delay stages without affecting the DFE throughput.

The following describes example operation of a decision feedback equalizer (DFE), with respect to a voltage-based DFE. As noted above, this disclosure describes a time-based DFE operations for equalizers 14A and 14B, but an understanding of a voltage-based DFE filter may be useful for understanding time-based DFE operations. Voltage-based DFE filter operation can be expressed as: $VDFE=VIN(t)+\Sigma_i x[n-i]^* w_i$, where VIN(t) is the incoming analog voltage, $x[n-i]$ is the i-th preceding bit, and $w_i$ is the corresponding weight. A slicer circuit than compares the VDFE to a threshold, and if VDFE is greater than the threshold, the slicer circuit outputs a logic high (e.g., high voltage level), and if VDFE is less than the threshold, the slicer circuit outputs a logic low (e.g., low voltage level).

In this example, VIN(t) is described as an "analog" signal because the ISI may have corrupted the communication signal, which is a digital voltage signal, to such an extent that logic ones and logic zeros of the communication signal cannot be readily resolved. For instance, in a communication signal, the voltage level is either a set high voltage level or a set low voltage level, with fast rise and fall times between the high and low voltage levels, such that when the communication signal is sampled, the voltage signal value will either be a high voltage level or a low voltage level. In an analog signal, the voltage level may be at or in between the high or low voltage levels, such that when the voltage signal is sampled, the voltage signal value may be in between the high and low voltage levels.

The following description of example techniques described in this disclosure is described with respect to equalizer 14A, but equalizer 14B operates in the same manner. In the examples described in this disclosure, equalizer 14A converts the input communication signal, represented as (VIN(t)), received from data line 16B, to a time-based signal (TIN). An example of a time-based signal is a rectangular wave that includes a plurality of rectangular pulses, where the timing of an edge of a rectangular pulse of the rectangular pulses is proportional to VIN(t). As an example, the higher the voltage level of VIN(t), the more equalizer 14A delays the edge of the rectangular pulse, and the lower the voltage level of VIN(t), the less equalizer 14A delays the edge of the rectangular pulse.

For instance, equalizer 14A includes a delay circuit that receives a clock signal and communication signal VIN(t), and outputs a rectangular pulse having a delayed edge (e.g., rising or falling edge), where the amount by which the edge is delayed is based on the voltage of VIN(t). The position of the edge of the time-based signal relative to an edge of a reference clock signal is indicative of the voltage level of VIN(t). As an example, if the rising edge of the time-based signal is before the rising edge of the reference clock signal, then the voltage level of VIN(t) is less than a voltage threshold, and if the rising edge of the time-based signal is after the rising edge of the reference clock signal, then the voltage level of VIN(t) is greater than the voltage threshold.

Assuming there was not any ISI, then VIN(t) would be a digital voltage signal, and same as the original communication signal transmitted by transceiver 12B. In this case, by comparing the rising edges of reference clock signal with the time-based signal, equalizer 14A may be able to output a voltage signal that is substantially the same as the communication signal, which may be a digital voltage signal. For example, if VIN(t) is a logic high, then the time-based signal representation of VIN(t) would have a rising edge of a rectangular pulse that is after a rising edge of the reference clock signal. If VIN(t) is a logic low, then the time-based signal representation of VIN(t) would have a rising edge of a rectangular pulse that is before a rising edge of the reference clock signal. By comparing the edges of the time-based signal and the reference clock signal, equalizer 14A may output a logic high when rising edge of the time-based signal is after the rising edge of the reference clock signal, and output a logic low when the rising edge of the time-based signal is before the rising edge of the reference clock signal, which is identical to VIN(t).

However, due to ISI, comparing edges of the time-based signal with the edges of the reference clock signal may be insufficient to properly reconstruct the digital voltage signal. For example, because of the analog nature of the communication signal VIN(t) and the ISI, what was a logic high at the time of transmission may be at a voltage level that is less than a voltage threshold. In this case, the rising edge of the time-based signal may be before the rising edge of the reference clock signal, and equalizer 14A may output a logic low, rather than a logic high. Similarly, because of the analog nature of the communication signal VIN(t) and the ISI, what was a logic low at the time of transmission may be at a voltage level that is greater than the voltage threshold. In this case, the rising edge of the time-based signal may be after the rising edge of the reference clock signal, and equalizer 14A may output a logic high, rather than a logic low.

To compensate for the ISI, equalizer 14A may include a plurality of delay circuits that are coupled sequentially to one another (e.g., the delay circuits may be arranged to process the time-based signal in series). The first delay circuit may be configured to receive the time-based signal, where the time-based signal represents the input voltage signal, and where the input voltage signal is a communication signal with ISI. The delay circuits in the plurality of delay circuits receive weighted feedback of previous samples of the output digital signal (e.g., equalized communication signal) of equalizer 14A, and further delay the time-based signal. Because the feedback is weighted previous samples of the output digital signal, the amount of delay added in the time-based signal is based the amount of ISI that is added. For instance, the amount that the previous samples are weighted (e.g., weighting factors) may be based on the electrical characteristics of data line 16B.

The output of the plurality of delay circuits is a delay data signal. The delay circuits are configured to adjust the timing of when the rising edge of the time-based signal occurs based on the weighting factors applied to the previous samples of the output digital signal (e.g., equalized communication signal). For instance, the delay circuits adjust the timing of when the rising edge of the time-based signal occurs to create further separation between when the rising edge of the delay data signal occurs and when the rising edge of the reference clock signal occurs. As an example, if the rising edge of the time-based signal occurred prior to the rising edge of a reference clock signal, but should occur after the rising edge of the reference clock signal, the delay circuits may adjust the timing of the rising edge of the time-based signal such that the rising edge of the delay data signal (e.g., the output of the delay circuits) is after the rising edge of the reference clock signal. Similarly, if the rising edge of the time-based signal occurred subsequent to the rising edge of a reference clock signal, but should occur before the rising edge of the reference clock signal, the delay circuits may adjust the timing of the rising edge of the time-based signal such that the rising edge of the delay data signal (e.g., the output of the delay circuits) is before the rising edge of the reference clock signal. In this manner, the plurality of delay circuits may compensate for the ISI.

A phase detector of equalizer 14A may compare the edges of the delay data signal and the reference clock signal, and output an output digital signal (e.g., equalized communication signal) that includes logic ones and logic zeros based on the comparison. For example, the phase detector may compare a timing of a rising edge of the delay data signal with a rising edge of the reference clock signal, and if the rising edge of the delay data signal is before the rising edge of the reference clock signal, the phase detector outputs a logic zero, and if the rising edge of the delay data signal is after the rising edge of the reference clock signal, the phase detector outputs a logic one.

In the above examples, an edge in the delay data signal before an edge in the reference clock signal is indicative of a logic zero, and an edge in the delay data signal before an edge in the reference clock signal is indicative of a logic one. However, in some examples, an edge in the delay data signal before an edge in the reference clock signal is indicative of a logic one, and an edge in the delay data signal before an edge in the reference clock signal is indicative of a logic zero. Also, in the above examples, the phase detector compared the rising edges of the delay data signal and reference clock signal. However, in some examples, the phase detector may compare the rising edges and/or falling edges of the delay data signal and the reference clock signal.

The edge of the delay data signal that is compared with the edge of the reference clock signal may be within one unit interval of each other, and in some examples, half a unit interval. A unit interval is equal to the inverse of the data rate, and is a measure of time. For instance, the unit interval for 10 Gbps is $1/10^{10}$, which is 100 picoseconds (ps). The timing of the edge of the delay data signal that is compared to the timing of the edge of the reference clock signal is ±1 unit interval or ±0.5*unit interval (e.g., ±100 ps or ±50 ps for 10 Gbps).

In techniques described in this disclosure, equalizer 14A is an example of a time-based DFE, where the equation of the time-based DFE can be represented as follows, and is similar to the voltage-based DFE equations above: TDFE=TIN(t)+$\Sigma_i$ x[n−i]*$w_i$, where TIN(t) is a function of the incoming analog voltage VIN(t) which is equalized using the previous binary outputs x[n−i] and weights $w_i$. The variable x[n−1] is the i-th preceding bit, and $w_i$ is the corresponding weight. The plurality of delay circuits are configured to add the weighted previous samples (e.g., $w_i$*x[n−i]) to the time-based signal TIN(t) to generate the delay data signal TDFE. In this way, the weighting factors (AO are built into the delay circuits. The phase detector (PD) compares the phase difference between the DFE path (e.g., TDFE) and the reference clock signal to generate a binary output. This is equivalent to the slicer operation in a voltage-based DFE, but in the time domain.

Equalizer 14A implementing the time-based DFE may provide several advantages compared to the CIVIL based architecture for voltage-based DFE such as good scalability, good low voltage operating margin, compact area, good tuning capability for process compensation, and no throughput loss for higher number of DFE taps. One reason why there is no throughput loss is because the number of DFE taps can be increased by simply adding more delay stages (e.g., delay circuits). Adding more delay circuits does not affect the parasitic capacitance of the individual delay circuit and hence the throughput remains constant regardless of the number of DFE taps (e.g., regardless of the number of previous samples used).

Figure 2:
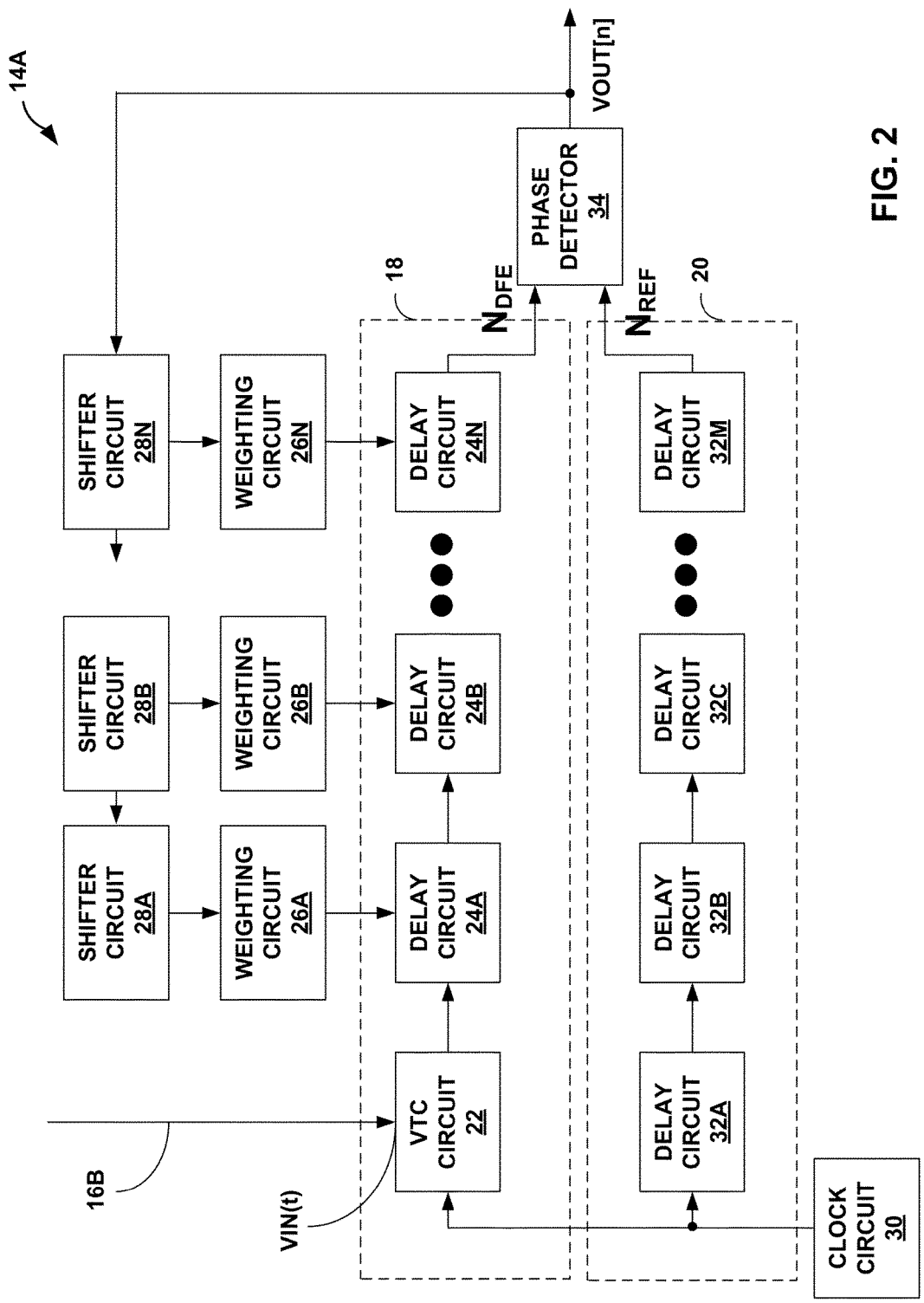
FIG. 2 is a block diagram illustrating an example time based decision feedback equalizer (TB-DFE) circuit.

FIG. 2 is a block diagram illustrating an example time based decision feedback equalizer (TB-DFE) circuit. For ease, FIG. 2 is described with respect to equalizer 14A, and equalizer 14B may include substantially similar, including identical, components as those illustrated in FIG. 2.

As shown in FIG. 2, equalizer 14A receives as input a communication signal transmitted via high-speed data line 16B, where the transmitted communication signal is shown in FIG. 2 as an input communication signal VIN(t) at the input of equalizer 14A. In general, equalizer 14A operates as a time-based decision feedback equalizer to compensate for ISI and other signal degradation effects of data line 16B to generate an equalized communication signal, represented as VOUT, representative of the original communication signal transmitted by transceiver 12B.

Equalizer 14A includes voltage-to-time (VTC) stage 18 and reference clock stage 20. The output of VTC stage 18 is a delay data signal represented by $N_{DFE}$, and the output of reference clock stage 20 is a reference clock signal represented by $N_{REF}$. Phase detector 34 receives the delay data signal and the reference clock signal as inputs, and compares the phases of corresponding edges (e.g., rising, falling, and/or rising and falling edges) of the delay data signal and the reference clock signal, and outputs a logic high (e.g., high voltage) or logic low (e.g., low voltage) based on the comparison. As described in more detail, the output digital signal (e.g., the equalized communication signal) from phase detector 34 (e.g., VOUT[n]) may be substantially similar (e.g., less than pre-determined bit-error-rate) as the input digital signal transmitted without the ISI (e.g., the original communication signal transmitted by transceiver 12B).

VTC stage 18 includes VTC circuit 22 and a plurality of delay circuits 24A-24N, collectively referred to as "delay circuits 24." Delay circuits 24 are sequentially coupled to a respective next one of delay circuits 24, except the last delay circuit 24N is coupled to phase detector 34. Delay circuits 24 are arranged to process the time-based signal from VTC circuit 22 in series to generate a delay data signal ($N_{DFE}$). Similarly, reference clock stage 20 includes a plurality of delay circuits 32A-32M that are sequentially coupled to a respective one of delay circuits 32, except the last delay circuit 32M is coupled to phase detector 34. In some examples, M is N+1 (i.e., there is one more of delay circuits 32 than delay circuits 24).

VTC stage 18 and reference clock stage 20 each receive a clock signal from clock circuit 30 as inputs. Clock circuit 30 may be a voltage controlled oscillator (VCO) that is configured to output at clock signal at a specific rate (e.g., 2.5 GHz, 5 GHz, 10 GHz). A clock signal means a series of ones and zeros with the same pulse width (e.g., a one is as long as a zero), and a zero is always followed by a one, and a one is always followed by a zero. In general, the clock signal that clock circuit 30 outputs is a clock signal with very little jitter such that the rising edges of the clock signal occur after the same time interval, and the falling edges of the clock signal occur after the same time interval.

VTC circuit 22 receives VIN(t) as an input communication signal, where VIN(t) is a voltage signal representing the digital communication signal transmitted by transceiver 12B but with ISI, and the clock signal from clock circuit 30. In some examples, VIN(t) is an analog voltage signal due to the ISI. For example, transceiver 12B may output a digital communication signal. However, due to the ISI from the data line 16B, the digital communication signal becomes an analog voltage signal, and equalizer 14A, via VTC circuit 22, receives the analog voltage signal VIN(t).

VTC circuit 22 converts the voltage signal, VIN(t), into a time-based signal, where a timing of when an edge of the time-based signal occurs is indicative of a voltage level of the voltage signal. For example, VTC circuit 22 delays an edge (e.g., rising, falling, or both edges) of the clock signal from clock circuit 30. The amount by which VTC circuit 22 delays the edge of the clock signal is proportional to the voltage level.

Figure 9:
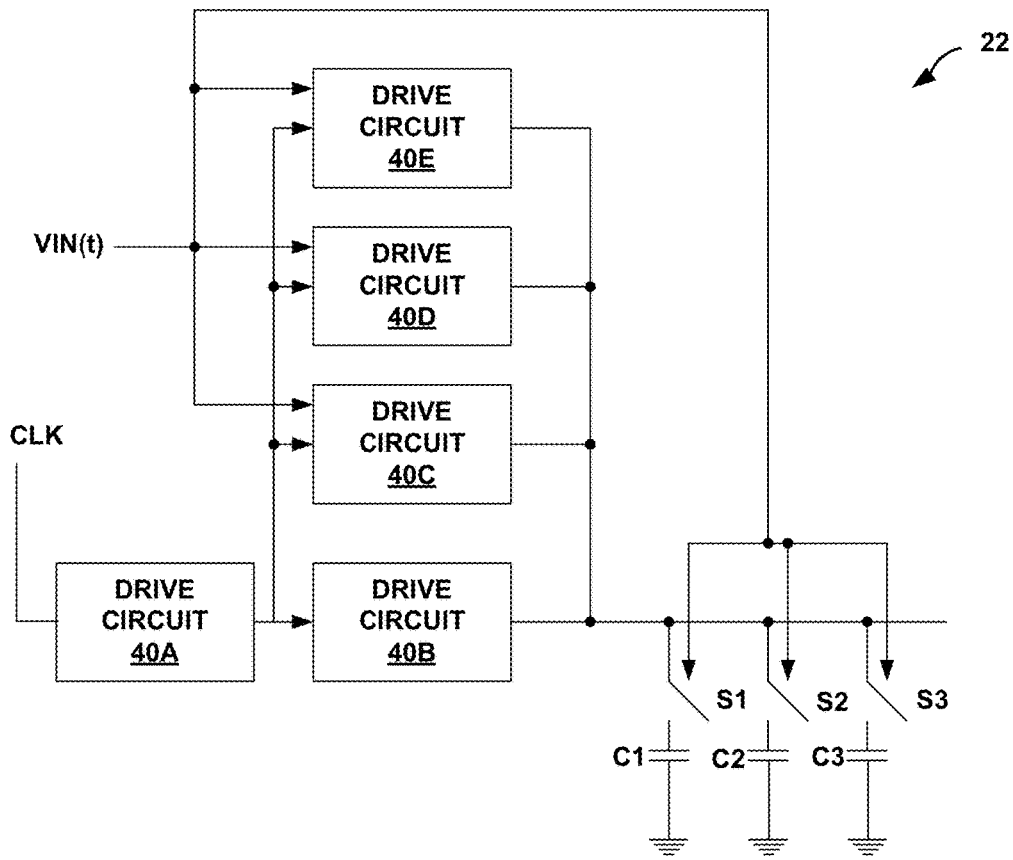
FIG. 9 is a circuit diagram illustrating one example of a voltage-to-time circuit in accordance with one or more example techniques described in this disclosure.

The time-based signal that VTC circuit 22 outputs is a pulse, similar to the clock signal. However, the pulse width of the ones and zeros of the time-based signal need not be the same, and are based on the voltage level of the voltage signal, VIN(t). For instance, the timing of when a rising edge in the time-based signal occurs for a relatively high voltage level of VIN(t) is different than the timing of when a rising edge in the time-based signal occurs for a relatively low voltage level of VIN(t). An example of VTC circuit 22 is illustrated in FIG. 9.

Delay circuit 24A receives the output of VTC circuit 22 (e.g., the time-based signal representative of the voltage level of communication signal, VIN(t)), and further delays the time-based signal to generate a temporally adjusted data signal. The amount by which delay circuit 24A may delay the time-based signal is based on the weighting factors applied by weighting circuit 26A and the digital value of a previous output sample. For instance, as illustrated in FIG. 2, the output of phase detector 34 may be the output digital signal, and samples of the output digital signal are fed back to shifter circuits 28A-28N (collectively "shifter circuits 28").

If the current sample of the output digital signal is [n], where [n] is a one or a zero, then shifter circuit 28N receives the digital sample value for [n]. Shifter circuit 28N had received the previous digital sample value [n−1], the shifter circuit 28N outputs to shifter circuit 28(N−1), and so forth. For ease, assume that there are three shifter circuits 28 in the example of FIG. 2. In this case, shifter circuit 28B would receive the digital sample value [n−1] from shifter circuit 28N. Shifter circuit 28B has the value [n−2] that shifter circuit 28B outputs to shifter circuit 28A. Therefore, in this example, shifter circuit 28N currently has the value for previous sample [n−1] of the output digital signal, and receives value for sample [n] of the output digital signal, shifter circuit 28B currently has the value for previous sample [n−2] of the output digital signal, and receives value for sample [n−1] of the output digital signal, and shifter circuit 28A currently has the value for previous sample [n−3] of the output digital signal, and receives the value for sample [n−2] of the output digital signal.

There may be various example ways in which to construct shifter circuits 28. As one example, shifter circuits 28 may each be a register configured to store a bit value. After rising edge of a clock signal, such as the output of clock circuit 30, each one of shifter circuits 28 output their respective pervious samples values to the next one of shifter circuits 28, expect shifter circuit 28A that drops its previous sample value. Shifter circuit 28N receives the current sample value of the output digital signal.

Each one of shifter circuits 28 output respective previous samples of the output digital signal to respective weighting circuits 26A-26N (collectively referred to as "weighting circuits 26"). For example, shifter circuit 28N outputs the value of previous sample [n−1] to weighting circuit 26N, shifter circuit 28B outputs the value of previous sample [n−2] to weighting circuit 26B, and shifter circuit 28A outputs the value of previous sample [n−3] to weighting circuit 26A. Although the example is described with respect to three shifter circuits 28 and three weighting circuits 26, the examples are extendable to examples where there are more or fewer shifter circuits 28 and weighting circuits 26.

Each one of weighting circuits 26 may be configured to apply respective weighting factors to respective previous samples of the output digital signal. The weighting factors may be preselected based on the electrical characteristics of data lines 16A, 16B. Another way to determine the optimal weighting factors is by sweeping the weighting factor of each individual stage and measuring the link performance. DFE weights are independent of each other which allows finding of optimal weight of each stage individually.

Figure 11:
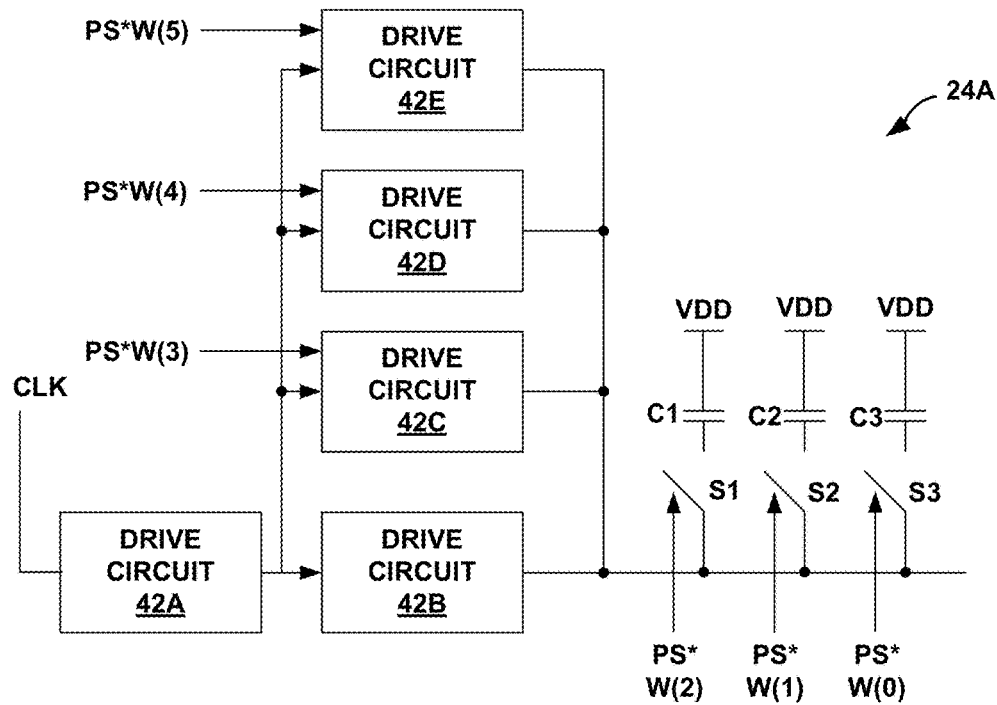
FIG. 11 is a circuit diagram illustrating an example of a delay circuit in accordance with one or more example techniques described in this disclosure.

One example way in which weighting circuits 26 apply respective weighting factors is by multiplying the weighting factors with the respective previous sample of the output digital signal. Accordingly, one example, weighting circuits 26 may include a plurality of multiplier circuits. For instance, weighting circuit 26N may apply a set of weighting factors to previous sample [n−1]. The set of weighting factors may include X factor values, and weighting circuit 26N may multiply each of the X factor values with previous sample [n−1] to generate weighted previous samples for previous sample [n−1]. Delay circuit 24N may delay a temporally adjusted data signal received from a preceding one of delay circuits 24 based on the weighted previous samples for previous sample [n−1]. Delay circuit 24A and delay circuit 24B may operate in a similar manner with weighted previous samples, where the previous samples are from shifter circuits 28A and 28B, respectively, and are weighted by respective ones of weighting circuits 26A and 26B. An example of delay circuits 24 is illustrated in FIG. 11.

Accordingly, in FIG. 2, one or more delay circuits 24 are arranged to process the time-based signal in series to generate a delay data signal. Delay circuits 24 are configured to adjust the timing of when the edge of the time-based signal occurs, and a corresponding time delay introduced by each of delay circuits 24 is configured based on a respective weighting factor applied to one or more samples of an output digital signal previously generated by the TB-DFE circuit (e.g., VOUT of equalizer 14A).

For instance, plurality of delay circuits 24 are sequentially coupled to a respective one of delay circuits 24. Delay circuits 24 are configured to generate respective temporally adjusted data signals based on the output of a preceding one of delay circuits 24 and respective weighted previous samples, where the weighting is performed by respective weighting circuits 26 and the previous samples are from shifter circuits 28. For example, a corresponding time delay introduced by each of delay circuits 24, to generate respective temporally adjusted data signals, is configured based on a respective weighting factor applied to one or more samples of an output digital signal previously generated by equalizer 14A.

A first delay circuit 24A is configured to receive the time-based signal from VTC circuit 22 and a first previous sample (e.g., previous sample [n−3] in the example of three delay circuits 24) of the output digital signal (e.g., equalized communication signal) VOUT[n] weighted with a first set of weighting factors by weighting circuit 26A. Delay circuit 24A generates a first temporally adjusted data signal based on the time-based signal the first previous sample weighted with the first set of weighting factors. For instance, delay circuit 24A adjust a timing of when an edge of the time-based signal occurs based on the weighted first previous sample.

A last delay circuit 24N receives a second temporally adjusted data signal from a preceding delay circuit (e.g., delay circuit 24B in the example where there are three delay circuits) and a second previous sample (e.g., previous sample [n−1]) of the output digital signal (e.g., equalized communication signal) VOUT[n] weighted with a second set of weighting factors by weighting circuit 26N. Delay circuit 24N generates the delay data signal ($N_{DFE}$) based on the second temporally adjusted data signal and the second previous sample of the output digital signal weighted with the second set of weighting factors, and outputs the delay data signal to phase detector 34.

In the above example, the first previous sample may be an earlier sample of the output digital signal than the second previous sample. For example, previous sample [n−3] (e.g., the first previous sample in the above example) is an earlier sample of the output digital signal than previous sample [n−1].

Delay circuits 24 may be considered as a first set of delay circuits. As illustrated, reference clock stage 20 includes a second set of delay circuits 32. Similar to delay circuits 24, delay circuits 32 may be sequentially coupled to respective next one of delay circuits 32. As illustrated, delay circuit 32A receives the clock signal from clock circuit 30, and delay circuit 32M outputs reference clock signal ($N_{REF}$).

Equalizer 14A includes delay circuits 32 to ensure that phase detector 34 compares corresponding edges of the delay data signal ($N_{DFE}$) generated by VTC stage 18 and the reference clock signal ($N_{REF}$) generated by reference clock stage 20. As illustrated, both VTC stage 18 and reference clock stage 20 receive the clock signal from clock circuit 30. Phase detector 34 should compare the edge of the clock signal that was received substantially at the same instance at VTC circuit 22 and delay circuit 32A. However, as delay circuits 24 adjust the timing of when edges of respective temporally adjusted data signals occur based on weighted samples, delay circuits 32 may similarly adjust the edge of the clock signal but without the adjustment being based on weighted samples (at least in the example illustrated in FIG. 2).

For example, in FIG. 2, VTC circuit 22 generates a time-based signal, and delay circuits 24 respectively adjust timing of edges as the time-based signal travels through delay circuits 24. Delay circuits 24 add the delay based on weighted previous samples of the output digital signal (e.g., equalized communication signal), and VTC circuit 22 generates the time-based signal based on the communication signal (VIN(t)) and the clock signal from clock circuit 30. Delay circuits 32 may be substantially similar, including identical, to VTC circuit 22 and delay circuits 24, but without any feedback or additional input, such as VIN(t) for VTC circuit 22. In this way, delay circuits 32 keep the correspondence between the edges of the clock signal received by VTC stage 18 and reference clock signal stage 20 so that phase detector 34 compares the corresponding edges to determine whether an edge of the delay data signal ($N_{DFE}$) is before or after a corresponding edge of the reference clock signal ($N_{REF}$).

In some examples, delay circuits 24 and delay circuits 32 may be controlled using weighting factors with opposite polarities. Also, as described in more detail with respect to FIG. 8, in some examples, it may be possible for a delay circuit in reference clock stage 20 to delay the clock signal based on a weighted previous sample of the output digital signal.

Figure 3A:
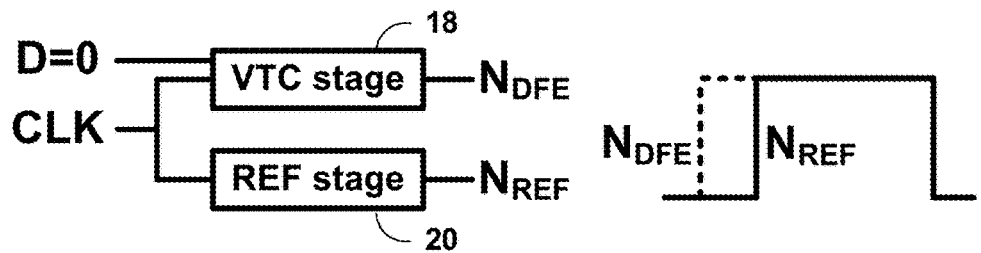
FIGS. 3A and 3B are timing diagrams illustrating examples of an edge of a time-based signal relative to reference clock signals.
Figure 3B:
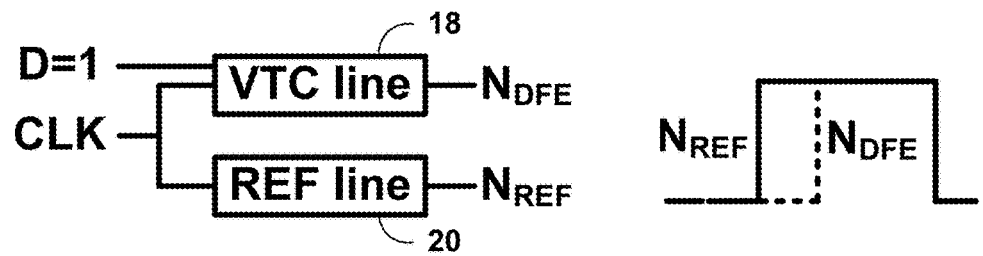

FIGS. 3A and 3B are timing diagrams illustrating examples of an edge of a time-based signal relative to reference clock signals. As illustrated in FIG. 3A, if VTC stage 18 receives a low voltage (e.g., VIN(t) is a logic zero), then a rising edge of the delay data signal ($N_{DEF}$), shown in dashed lines, occurs before a rising edge of the reference clock signal ($N_{REF}$). As illustrated in FIG. 3B, if VTC stage 18 receives a high voltage (e.g., VIN(t) is a logic high), then the rising edge of the delay data signal ($N_{DEF}$), shown in dashed lines, occurs after a rising edge of the reference clock signal ($N_{REF}$).

Phase detector 34 may compare the rising edges of corresponding delay data signals and reference clock signals, and output the output digital signal based on the comparison. For example, in FIG. 3A, phase detector 34 may determine that the rising edge of the delay data signal occurred before the rising edge of the reference clock signal, and may output a logic zero, which corresponds to VIN(t) equaling a logic zero. In FIG. 3B, phase detector 34 may determine that the rising edge of the delay data signal occurred after the rising edge of the reference clock signal, and may output a logic one, which corresponds to VIN(t) equaling a logic one.

Although the above example is described with respect to rising edges, in some examples, VTC stage 18 and reference clock signal 20 may adjust the falling edges or both the rising and falling edges. Phase detector 34 may then compare the falling edges or both the rising and falling edges. Also, in the above example, an edge of the delay data signal occurring before an edge of the reference clock signal indicates a logic zero, and an edge of the delay data signal occurring after an edge of the reference clock signal indicates a logic one. In some examples, an edge of the delay data signal occurring before an edge of the reference clock signal indicates a logic one, and an edge of the delay data signal occurring after an edge of the reference clock signal indicates a logic zero.

Figure 4:
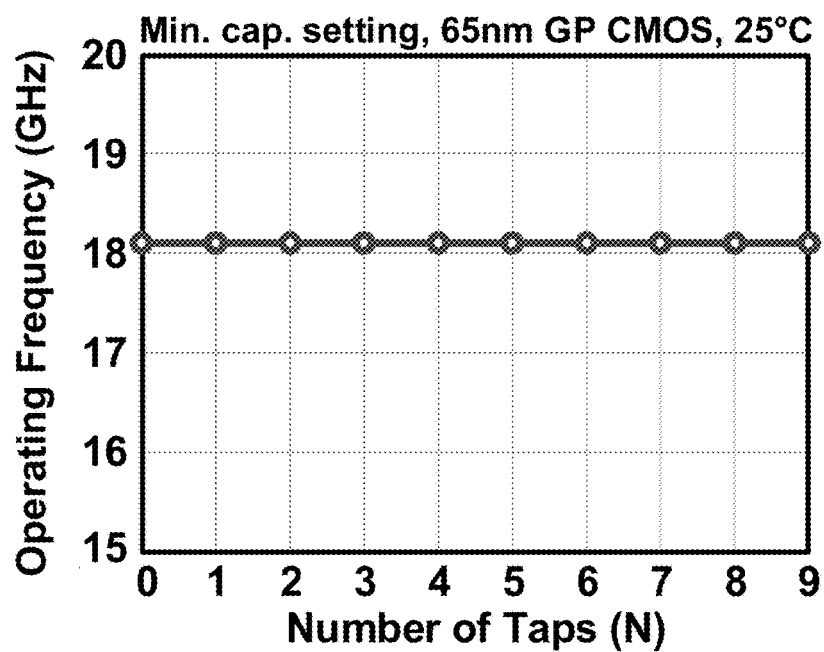
FIG. 4 is a graph illustrating operating frequency as a function of taps in an equalizer circuit.

FIG. 4 is a graph illustrating operating frequency as a function of taps in an equalizer circuit. A tap, as used in the disclosure, refers to the number of previous samples of the output digital signal that are used for equalizing. For instance, in FIG. 2, there are N-taps as there are delay circuits 24A-24N. In some examples, there may be 3-taps, but more or fewer taps are possible. In general, the more taps that are used in a decision feedback equalizer, the better the equalizer is at removing ISI. In some cases, 3-taps are sufficient to remove substantial ISI to achieve a desired bit-error rate of $10^{-12}$ for data line lengths of 10 mm or less (e.g., the length of data lines 16A, 16B is less than or equal to 10 mm). However, for longer data line lengths or if a lower bit-error rate is needed, then more than 3-taps may be used.

FIG. 4 illustrates that equalizer 14A operates the same at 18 GHz operating frequency (e.g., the frequency of the clock signal outputted by clock circuit 30 is 18 GHz) for up to 9-taps. In contrast to some techniques that do not use time-based decision feedback equalizers, as more taps are added, the operating frequency drops, where at 9-taps, the operating frequency is less than 10 GHz. However, for a time-based decision feedback equalizer (TB-DFE) like equalizer 14A, there is no drop in operating frequency even with 9-taps.

Figure 5:
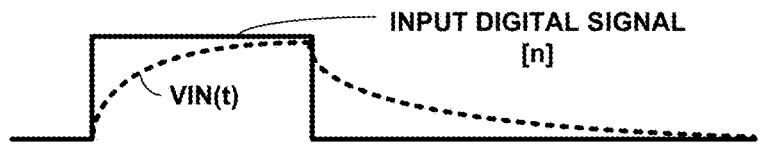
FIG. 5 is a graph illustrating inter-symbol interference (ISI) on an input voltage signal.

FIG. 5 is a graph illustrating inter-symbol interference (ISI) on an input voltage signal. For instance, input digital signal [n] is a digital signal that transceiver 12B may output. In FIG. 5, input digital signal [n] is a 0100 digital signal. However, due to the ISI from data line 16B, input digital signal [n] turns into an analog voltage signal, VIN(t), which is the input communication signal. As illustrated by the dashed lines in FIG. 5, VIN(t) does not have a fast rise or fall time. Rather, VIN(t) gradually increases from a low voltage to a high voltage, and gradually decreases from a high voltage to a low voltage. Therefore, analog voltage signal VIN(t) includes move voltage levels over time than input digital signal [n]. In other words, due to the channel ISI, the original square waveform (e.g., input digital signal [n]) becomes a smoother waveform VIN(t) by the time it reaches equalizer 14A.

Figure 6A:
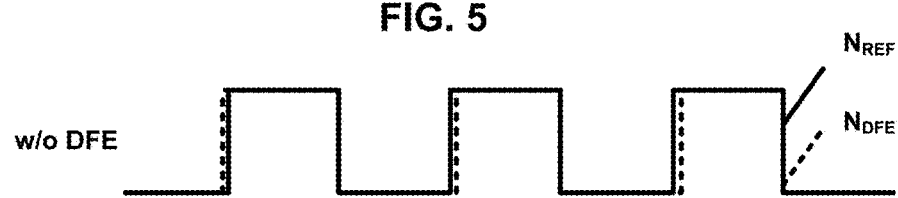
FIGS. 6A and 6B are timing diagrams illustrating locations of edges of a time-based signal relative to a reference clock signal.
Figure 6B:
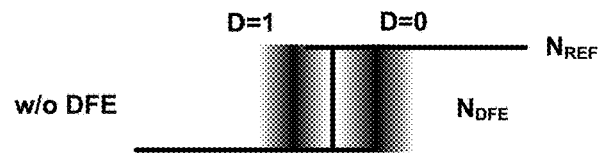

FIGS. 6A and 6B are timing diagrams illustrating locations of edges of a time-based signal relative to a reference clock signal. In particular, in FIGS. 6A and 6B, there is no decision feedback equalization that is performed on VIN(t). For instance, in FIG. 6A, the dashed line represents the output from VTC circuit 22 (e.g., $N_{DFE}$ in this example), without equalization from delay circuits 24, and the solid line represents the output of delay circuit 32A. As illustrated, the rising edge of the time-based signal (e.g., output of VTC circuit 22) is slightly before or slightly after the rising edge of the output of delay circuit 32A. FIG. 6B illustrates this in greater detail, which may be considered as an eye-diagram but in time domain. For instance, FIG. 6B illustrates where the rising edges of the time-based signals would be relative to a rising edge of the reference clock signal (e.g., output of delay circuit 32A in this example). As illustrated, there is not much separation between the edge of the reference clock signal and the edge of the time-based signal. This is due to the ISI.

For example, for voltage levels of VIN(t) that are not very low and are not very high, such as the point where VIN(t) is illustrated in FIG. 5, the edge of the time-based signal may only be slightly earlier or later than the edge of the reference clock signal. Stated another way, there is little margin between the edge of reference clock signal and the edge of the time-based signal. This little margin means that phase detector 34 may not be able to properly resolve whether an edge of the time-based signal occurred before or after an edge of the reference clock signal.

Also, the ISI may be sufficient to cause an edge of the time-based signal to be after an edge of the reference clock signal. This may occur especially if the clock signal is not centered to the digital signal. For instance, as illustrated in FIG. 6A, the reference clock signal occurs approximately at the center point of the logic one of input digital signal [n]. In such examples, the reference clock signal may be considered as sampling the input digital signal [n] at the center of the digital bit. However, the reference clock signal is in effect sampling the communication signal (VIN(t)) because the ISI causes input digital signal [n] to become an analog voltage signal VIN(t). If the reference clock signal is not properly centered, there is a higher likelihood that an edge of the time-based signal that should occur after an edge of the reference clock signal occurs before the edge of the reference clock signal, and vice-versa.

Accordingly, without the time-based decision feedback equalizing techniques described in this disclosure, phase detector 34 may output a logic high, when the input digital signal was a logic zero, and vice-versa, resulting in poor bit-error rate. For example, in FIGS. 6A and 6B, the distorted voltage (e.g., VIN(t)) is converted to the corresponding time delay which contains ISI noise. This results in a reduced sensing margin between the DFE path signal ($N_{DFE}$) (e.g., VTC stage 18) and the reference path signal ($N_{REF}$) (e.g., reference clock stage 20). The reduced phase difference may lead to a bit error. The time-based decision feedback equalizing techniques described in this disclosure may expand the margin between the edge of the reference clock signal and the delay data signal so that phase detector 34 may correctly determine whether the input digital signal [n] included a logic high or a logic low. For instance, the time-based decision feedback equalizing techniques utilize the preceding bits (e.g., previous samples of the output digital signal) to expand the phase difference leading to a more reliable phase detection by phase detector 34. The improvement in sensing window using the time-based decision feedback equalizing techniques are illustrated in FIGS. 7A and 7B.

Figure 7A:
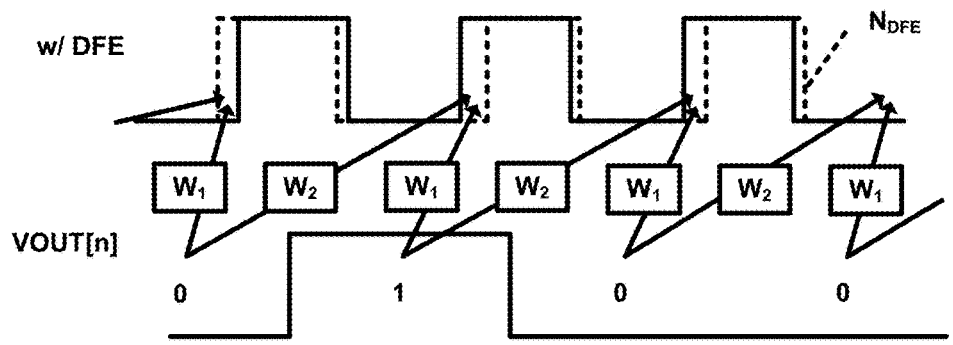
FIGS. 7A and 7B are timing diagrams illustrating locations of edges of a time-based signal relative to a reference clock signal in accordance with example techniques described in this disclosure.
Figure 7B:
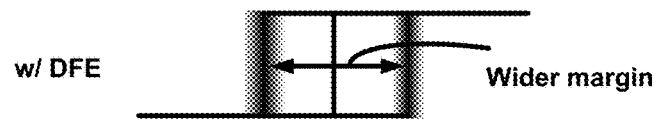

FIGS. 7A and 7B are timing diagrams illustrating locations of edges of a time-based signal relative to a reference clock signal in accordance with example techniques described in this disclosure. In FIG. 7A, $W_1$ and $W_2$ represent weighted previous samples of the output digital signal. Accordingly, the example of FIGS. 7A and 7B may be generated with a 2-tap TB-DFE (e.g., equalizer 14A includes 2-taps). As illustrated in the bottom of FIG. 7A, VOUT[n] tracks the input digital signal [n], and reproduces the 0100 pattern. FIG. 7B illustrates the eye-diagram in the time-domain with the wider margin, as compared to the margin in FIG. 6B. By using delay circuits 24 to adjust the timing of an edge of the time-based signal, where the amount of adjustment is based on weighted previous samples of the output digital signal, the time-based decision feedback equalizing techniques may generate a wider margin for the comparison of when an edge in the delay data signal occurred relative to the reference clock signal, allowing for phase detector 34 to correctly determine whether transceiver 12B outputted a logic zero or a logic one in the input digital signal [n]. Furthermore, because of the wider margin, even if the reference clock signal were not to sample at the idle center point, there is sufficient margin for phase detector 34 to still correctly resolve between a logic one and a logic zero.

Figure 8:
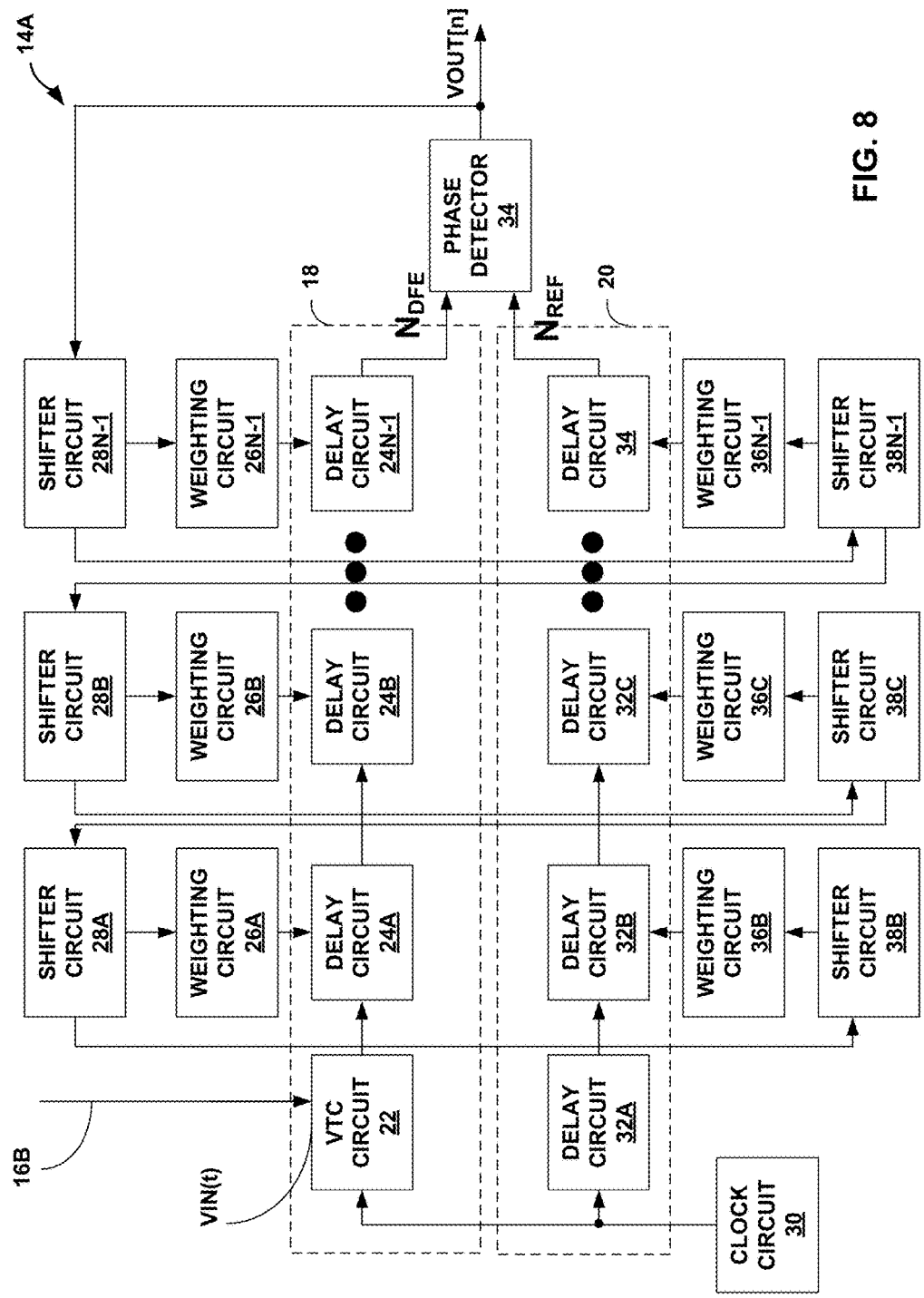
FIG. 8 is a block diagram illustrating another example TB-DFE circuit.

FIG. 8 is a block diagram illustrating another example TB-DFE circuit. For ease, FIG. 8 is described with respect to equalizer 14A, and equalizer 14B may include substantially similar, including identical, components as those illustrated in FIG. 2. The TB-DFE circuit illustrated in FIG. 8 may be similar to the TB-DFE circuit illustrated in FIG. 2. However, the example illustrated in FIG. 8 only requires half the number of delay stages for performing the same TB-DFE operation. This is achieved by folding half the delay stages from the main delay line to the reference delay line while switching the polarity of the weighting factors. Delay stages in the reference clock stage 20 includes delay circuits 32 and delay circuit 34 that delay the clock signal outputted by a preceding one of delay circuits 32 based on a weighted previous sample, where the previous sample is the [n−1] sample. For instance, shifter circuit 38 outputs the previous sample [n−1] to weighting circuit 36, and weighting circuit 36 applies a set of weighting factors to generate the weighted previous sample. The subsequent shifted signals are cross routed between the main delay line (e.g., VTC stage 18) that includes shifter circuits 28 and weighting circuits 26 and the reference delay line (e.g., reference clock stage 20) that includes shifter circuits 38N-1 to 38B and weighting circuits 36N-1 to weighting circuit 36B to satisfy timing requirements. Delay circuit 34 then delays the clock signal based on the weighted previous sample.

Including delay circuit 34 in the reference clock stage 20 may allow for fewer delay circuits 24 in VTC stage 18. For example, in FIG. 8, VTC stage 18 includes delay circuits 24A-24N-1. Equalizer 14A of FIG. 8 may include one less delay circuit 24 in VTC stage 18 as compared to VTC stage 18 of equalizer 14A of FIG. 2. This results in reduced power consumption and chip area because fewer delay circuits 24 are needed. It may be possible for there to be further reduction in the number of delay circuits 24 (e.g., more of reduction than one of delay circuits 24) based on the weighting factors of weighting circuit 36.

The inclusion of delay circuit 34 may be considered as folding one of delay circuits 24 of VTC stage 18 into reference clock stage 20. To understand why delay circuit 34 may be included in reference clock stage 30, assume that VTC stage 18 includes three delay circuits 24 (e.g., delay circuit 24A, 24B, and 24N). Also assume that delay circuit 24A adjusts edges of the time-based signal by a time T1, delay circuit 24B adjusts edges of the temporally adjusted data signal that delay circuit 24A outputs by a time T2, and delay circuit 24N adjusts edges of the temporally adjusted data signal that delay circuit 24B outputs by a time T3. As above, delay circuit 24N outputs the delay data signal. Also, assume that reference clock stage 20 includes three delay circuits 32 that each delay the clock signal by TREF.

In this example, if delay circuit 24N is included in reference clock stage 20 as delay circuit 34, and the delay applied by delay circuit 34 is equal to 2*TREF−T3, then the correspondence between the delay data signal and the reference clock signal will be maintained. In other words, there would not be mismatch in the delays through VTC stage 18 and reference clock stage 20, and phase detector 34 would compare corresponding edges of delay data signal and the reference clock signal to determine whether to output a logic one or a logic zero.

For example, delays T1, T2, and T3 of the upper delay line (e.g., VTC stage 18) are controlled by the current input communication signal (e.g., VIN(t)), preceding bits (e.g., previous samples of the output digital signal), and the DFE weights (e.g., the set of weights applied by delay circuits 24 to the respective previous samples). Delay of the lower reference delay line (e.g., reference clock stage 20) is fixed (e.g., each delay circuit 32 delays by TREF). Phase detector 34 compares the two delays T1+T2+T3 and 3*TREF to determine the output bit of the output digital signal. If delay circuit 24N, that delays by T3, is moved to reference clock stage 20, but with a negative polarity and positive delay offset (i.e. 2*TREF−T3), the phase comparison result remains the same as the original implementation (e.g., example of FIG. 2). That is, the same DFE function can be realized with fewer delay stages which translates into a lower power consumption and smaller chip area.

For long delay lines, the power and area can be cut down by almost 50% using this technique. Also, all delay circuits 24 and 32 including the one denoted by 2TREF−T3 (e.g., delay circuit 34) can be implemented using the same exact circuit, as illustrated in FIGS. 9 and 11. This is possible is because the delay ranges for T1, T2 and 2TREF−T3 are the same when the nominal values of T1, T2, and T3 are equal to TREF. This can be explained using the following example. Suppose delays T1, T2, and T3 are all centered around TREF with a programmable delay range of ±ΔT.

In this example, max (T1, T2, T3) equals TREF+ΔT, and min(T1, T2, T3) equals TREF−ΔT. Then the range of $2T_{REF}-T3$ can be calculated as follows:

$$\max(2*TREF - T3) =$$
$$2*TREF - \min(T3) = 2*TREF - (TREF - \Delta T) = TREF + \Delta T$$
$$\min(2*TREF - T3) =$$
$$2*TREF - \max(T3) = 2*TREF - (TREF + \Delta T) = TREF - \Delta T$$

As shown in these equations, the new delay stage (e.g., delay circuit 34 delaying by 2*TREF−T3) has the same delay range as other three delay stages (e.g., delay circuits 24A, 24B, and 24N delaying by T1, T2 and T3). This allows utilizing the same circuit for all delay circuits which ensures a uniform layout with minimum delay mismatch. In some examples, equalizer 14A is a differential circuit, and therefore, can cancel out common-mode effects such as voltage and temperature drifts affecting both delay lines (e.g., VTC stage 18 and reference clock stage 20). Another point is that with the proposed delay transformation, the number of delay stages required for an N-tap DFE may be lowered to N/2 (e.g., N/2 previous samples of the output digital signal are needed). In contrast, an N-tap DFE operation using CIVIL requires N (not N/2) pull-down paths. For instance, 8 tap delay in CML DFE circuit corresponds to 4 tap delay in the example illustrated in FIG. 8. This makes TB-DFE circuit example of FIG. 8 an even better technique for decision feedback equalizing as compared to CML based DFE for large N values.

FIG. 9 is a circuit diagram illustrating one example of a voltage-to-time circuit in accordance with one or more example techniques described in this disclosure. For instance, FIG. 9 illustrates an example of VTC circuit 22 of FIGS. 2 and 8. VTC circuit 22 includes drive circuits 40A-40E (collectively, drive circuits 40). In some examples, drive circuits 40A-40E may be different sized inverters. For example, drive circuits 40A, 40B, and 40E may be four times larger than drive circuit 40C, and drive circuit 40D may be twice as large as drive circuit 40C.

VTC circuit 22 also includes capacitors C1-C3 that are selectively coupled to the output of VTC circuit 22, where the output of VTC circuit 22 is a time-based signal that is generated based on the communication signal, VIN(t), and the clock signal from clock circuit 30. Capacitor C3 may provide four times the capacitance as capacitor C1, and capacitor C2 may provide twice the capacitance of capacitor C1. Switches S1-S3 selectively couple respective ones of capacitors C1-C3 to the output of VTC circuit 22.

Drive circuits 40C-40E may be selective turned on based on the voltage level of VIN(t), and switches S1-S3 may selective couple capacitors C1-C3 to the output of VTC circuit 22 based on the voltage level of VIN(t). In this way, by selectively coupling capacitors C1-C3 and turning on or off drive circuits 40C-40E, VTC circuit 22 may adjust the timing of an edge of the time-based signal that VTC circuit 22 outputs occurs. The timing of when an edge of the time-based signal occurs is based on the voltage level of the voltage signal because the voltage level of the voltage signal selectively turns on or off drive circuits 40C-40E and selectively couples capacitors C1-C3 to the output of VTC circuit 22. Therefore, a timing of when an edge of the time-based signal occurs is indicative of a voltage level of the voltage signal VIN(t).

Accordingly, FIG. 9 shows the detailed implementation of the analog delay control stage (e.g., VTC circuit 22) which includes of four parallel tri-state inverters (including one always-on inverter) (e.g., one example of delay circuits 40A-40E) and three MOS capacitors (e.g., capacitors C1-C3). The control signals of the parallel inverters (e.g., delay circuits 40C-40E) and capacitors C1-C3 are directly connected to the incoming communication voltage, VIN(t), to maximize delay range.

Figure 10:
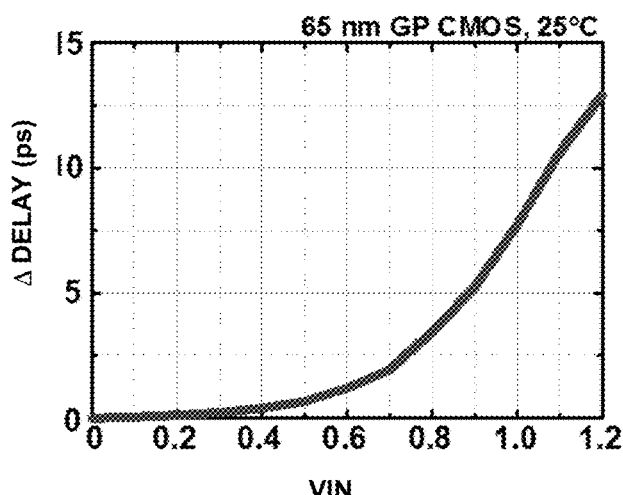
FIG. 10 is a graph illustrating delay through the circuit of FIG. 9 as a function of input voltage.

FIG. 10 is a graph illustrating delay through the circuit of FIG. 9 as a function of input voltage. In FIG. 10, for a 1.2V change in the voltage signal, VIN(t), the delay changes by 12 pico-seconds (ps). For instance, if the voltage level of VIN(t) is 0V, then there is no change in an edge (e.g., rising edge) of the time-based signal (i.e., the edge of the time-based signal and the corresponding edge of a reference clock signal would be at the same time). However, if the voltage level of VIN(t) is 1.2V, then there is a change of 12 ps in an edge of the time-based signal (i.e., the edge of the time-based signal would occur 12 ps after a corresponding edge of a reference clock signal).

FIG. 11 is a circuit diagram illustrating an example of a delay circuit in accordance with one or more example techniques described in this disclosure. For instance, FIG. 11 shows the detailed implementation of the digital delay control stage (e.g., delay circuit 24A). Although the example is illustrated with respect to delay circuit 24A, delay circuits 24B-N may be substantially similar, including identical, to the example of delay circuit 24A but may be controlled based on the different weighting factors and different previous samples of the output digital signal. Also, delay circuits 32 may be similar, including identical, to delay circuit 24A but may not be controlled by a previous sample of the output digital signal or weighting factors. Delay circuit 34 may be similar, including identical, to the example of delay circuit 24A but may receive different weighting factors as described above with respect to FIG. 8.

Delay circuit 24A is almost identical to the analog delay stage (e.g., VTC circuit 22) except that the capacitors C1-C3 are connected to VDD (e.g., positive supply voltage which may be 1.2V as one example) rather than ground, as illustrated in FIG. 9, for a wider delay range (e.g., allowing for the adjustment to occur over a wider range). For instance, delay circuit 24A includes drive circuits 42A-42E which may be the same as drive circuits 40A-40E of FIG. 9 (e.g., different sized inverters that can be selectively turned on or off).

Where VTC circuit 22 is controlled by VIN(t) and the clock signal, the amount of delay (e.g., adjustment in timing of an edge) that delay circuit 24 causes is controlled by the feedback data PS and a 6-bit weight factor represented as w<5:0>. Each one of delay circuits 24 receives a temporally adjusted data signal. For example, delay circuit 24A receives the time-based signal from VTC circuit 22, which is one example of a temporally adjusted data signal. Delay circuit 24A further adjusts edges of the temporally adjusted data signal, and transmits its own temporally adjusted data signal to delay circuit 24B, and so on, until delay circuit 24N generates and outputs the delay data signal.

In the example illustrated in FIG. 11, "PS" represent a value of a previous sample the output voltage signal. As an example, if there are three delay circuits 24, then delay circuit 24A would receive Vout[n−3], which is previous sample [n−3] of the output digital signal, where the current sample is [n]. In this example, PS is the value of previous sample [n−3]. The other delay circuits 24 may receive a different previous sample value (e.g., delay circuit 24N receives the value for previous sample [n−1]).

W<5:0> is an example way to indicate that the set of weighting factors for delay circuit 24A. For example, w[0] is a first weighting factor of the set of weighting factors, w[1] is a second weighting factor of the set of weighting factors, and so on, with w[5] being the sixth weighting factor of the set of weighting factors. In this example, each of the weighting factors is a bit value of 0 or 1, but other values are possible. Therefore, w<5:0> value ranges from 0 (e.g., 000000) to 63 (e.g., 111111), where each bit represents one weighting factor (e.g., one of w[0] to w[5]) of the set of weighting factors w<5:0>.

PS and the respective weighting factor together determine whether or not the weight is applied to drive circuits 42C-42E to selectively turn on drive circuits 42C-42E and whether or not switches S1-S3 couple respective ones of capacitors C1-C3 to the output of delay circuit 24A. For example, w<5:0> weighting factors determine how many inverters (e.g., drive circuits 42C-42E) and capacitors C1-C3 are turned on.

For example, with respect to delay circuit 24A, weighting circuit 26A may be configured to perform the multiplication operation with the weighting factors w<5:0> and the PS value received from shifter circuit 28A. As illustrated, weighting circuit 26A may multiply PS with w[5], and based on the result selectively turn or off drive circuit 42E of delay circuit 24A. Weighting circuit 26A may multiply PS with w[4], and based on the result selectively turn or off drive circuit 42D of delay circuit 24A. Weighting circuit 26A may multiply PS with w[3], and based on the result selectively turn or off drive circuit 42C of delay circuit 24A.

Also, weighting circuit 26A may multiple PS with w[2], and based on the result selectively couple or not couple capacitor C1 to the output of delay circuit 24A. Weighting circuit 26A may multiple PS with w[1], and based on the result selectively couple or not couple capacitor C2 to the output of delay circuit 24A. Weighting circuit 26A may multiple PS with w[0], and based on the result selectively couple or not couple capacitor C3 to the output of delay circuit 24A.

The remaining delay circuits 24 and weighting circuits 26 may operate in a similar manner on their respective PS values and respective weighting factors. Accordingly, a corresponding time delay introduced by each of delay circuits 24, to generate respective temporally adjusted data signals, is configured based on a respective weighting factor applied to one or more samples of an output digital signal previously generated by equalizer 14A. In this way, each one of delay circuits 24 may generate temporally adjusted data signal based on the temporally adjusted data signal of a preceding one of delay circuits 24, where the adjustment is based on respective previous samples and weighting factors. For example, delay circuit 24A may receive the time-based signal (e.g., output of VTC circuit 22) and a first previous sample (e.g., previous sample [n−3]) of the output digital signal weighted with a first set of weighting factors by weighting circuit 26A (e.g., PS*w<5:0> for delay circuit 24A, as illustrated). Delay circuit 24A may generate a first temporally adjusted data signal based on the time-based signal and the first previous sample weighted with the first set of weighting factors. Delay circuit 24A may output the first temporally adjusted data signal to a next delay circuit (e.g., delay circuit 24B).

Delay circuit 24N may be configured to receive a second temporally adjusted data signal from a preceding delay circuit 24N-1 and a second previous sample (e.g., previous sample [n−1]) of the output digital signal weighted with a second set of weighting factors by weighting circuit 26N (e.g., PS*w<5:0> for delay circuit 24N, as illustrated). Delay circuit 24N may generate the delay data signal based on the second temporally adjusted data signal and the second previous sample of the output digital signal weighted with the second set of weighting factors, and output the delay data signal to the phase detector 34. These operations may together provide the wider margin for phase detector 34 as illustrated in FIG. 7B.

The set of weighting factors w<5:0> may be preselected and stored on electronic circuit 10. For example, the set of weighting factors may be determined in a lab based on equalization needed for different lengths of data lines 16A, 16B. Then, during manufacturing of equalizer 14A, the respective set of weighting factors may be set in weighting circuits 26 based on the known length of data lines 16A, 16B. There may be other ways in which to determine the set of weighting factors, such as by modeling and simulation, may be possible, and the techniques to determine the set of weighting factors described in this disclosure should not be considered as limiting.

Figure 12:
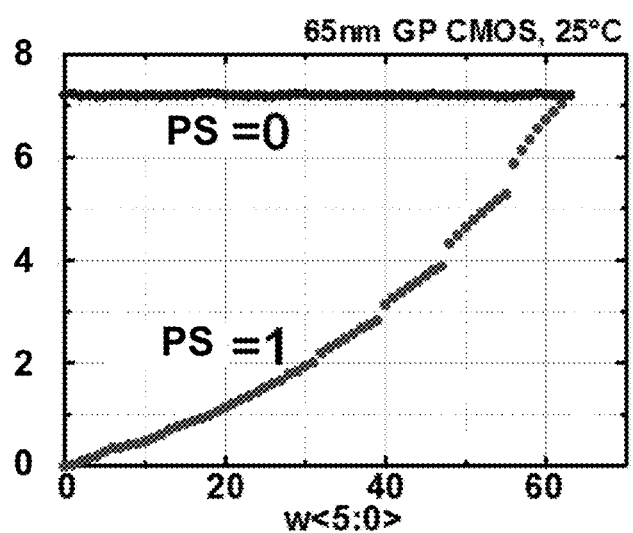
FIG. 12 is a graph illustrating delay through the circuit of FIG. 11 as a function of weighting factors.

FIG. 12 is a graph illustrating delay through the circuit of FIG. 11 as a function of weighting factors. FIG. 12 shows the simulated delay change versus different configurations. The delay (e.g., the amount by which an edge of the temporally adjusted data signal is adjusted) remains constant when data is '0'. When data is '1', the delay (e.g., the amount by which an edge of the temporally adjusted data signal is adjusted) varies according to the different configurations. Non-linearity of the PS=1 delay curve may not be of concern for proper TB-DFE operation of equalizer 14A. With a 6-bit control, in this example, it may be possible to set the set of weighting factors to their desired values with sufficient accuracy.

Figure 13:
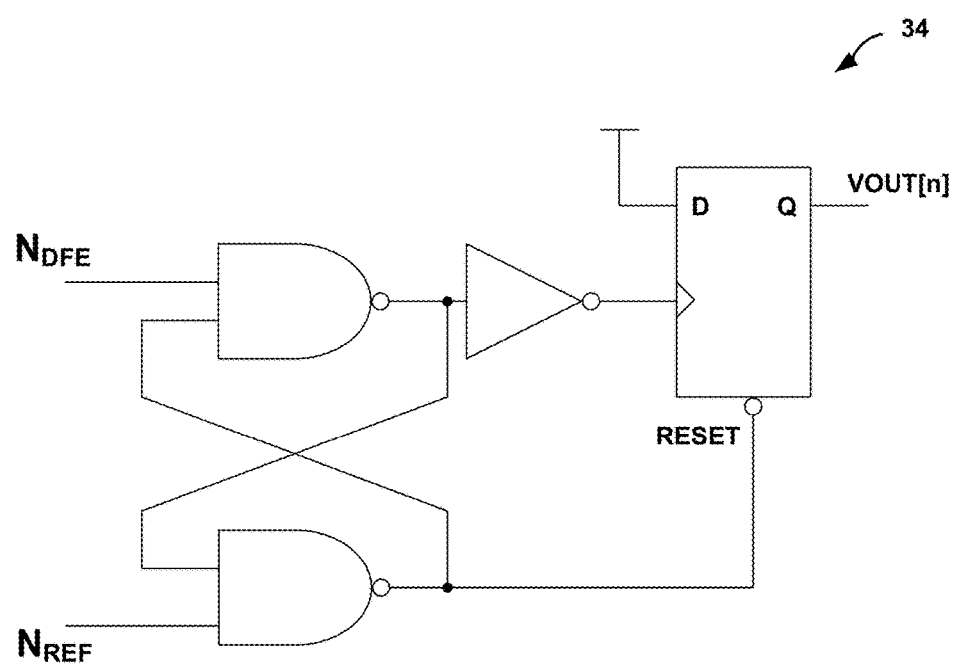
FIG. 13 is a circuit diagram illustrating an example phase-detector in accordance with one or more example techniques described in this disclosure.

FIG. 13 is a circuit diagram illustrating an example phase-detector in accordance with one or more example techniques described in this disclosure. For instance, FIG. 13 illustrates an example of phase detector 34, but other examples of phase detector 34 are possible. Phase detector 34 is an example of a zero-offset aperture phase detector which includes a set-reset-latch and a flip-flop. S. Kundu, B. Kim and C. H. Kim, "A 0.2-1.45-GHz Subsampling Fractional-N Digital MDLL With Zero-Offset Aperture PD-Based Spur Cancellation and In Situ Static Phase Offset Detection," in *IEEE J. of Solid-State Circuit*, vol. 52, no. 3, pp. 799-811, March 2017 provides some additional disclosure of phase detector 34 and is incorporated by reference herein.

Simulation results of the zero-offset aperture phase detector 34 are described below. When the upper input signal arrives earlier (e.g., edge of delay data signal ($N_{DFE}$) is before corresponding edge of reference clock signal ($N_{REF}$)), then the flip-flop will sample a '1', and vice versa. Because the input phase difference between the delay data signal and the reference clock signal is sufficiently large compared to an aperture time window of phase detector 34, there may not be a metastable output response.

Figure 14:
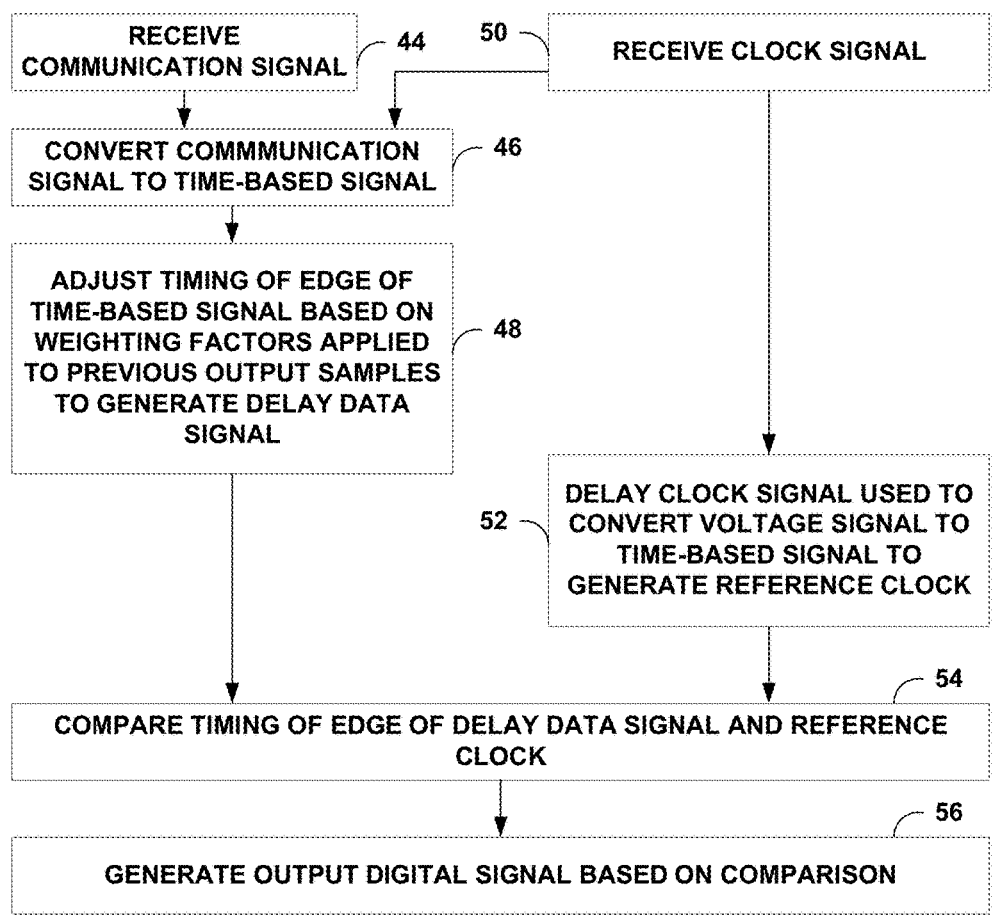
FIG. 14 is a flowchart illustrating an example method of operation in accordance with one or more example techniques described in this disclosure.

FIG. 14 is a flowchart illustrating an example method of operation in accordance with one or more example techniques described in this disclosure. For example, FIG. 14 illustrates an example operation for how equalizer 14A formed as a time-based decision feedback equalizer (TB-DFE) may compensate for ISI caused by the electrical characteristics of data line 16B.

Equalizer 14A receives a communication signal, VIN(t), from transceiver 12B (44). The communication signal that equalizer 14A receives may be an analog voltage signal. Transceiver 12B may have transmitted a digital data signal including logic ones and zeros at set voltage levels and relatively fast rise and fall times. However, the ISI caused by the electrical characteristics of data line 16B cause the rise and fall times to be longer, and the voltage levels, at times, not reaching either the voltage level of a logic one or the voltage level of a logic zero. Therefore, the communication signal, VIN(t), that equalizer 14A receives is the input digital signal transmitted by transceiver 12B with ISI.

VTC circuit 22 may convert the voltage signal to a time-based signal (46). As described above, a time-based signal is a rectangular wave of ones and zeros. However, the pulse width of the ones and zeros may be based on the voltage level of the voltage signal. Accordingly, a timing of when an edge of the time-based signal occurs is indicative of a voltage level of the voltage signal. VTC circuit 22 receives a clock signal from clock circuit 30 (50). VTC circuit 22 generates the time-based signal based on the clock signal and the voltage signal. For example, VTC circuit 22 adjusts (e.g., delays) an edge of the clock signal based on the voltage level of the voltage signal to generate the time-based signal, and in this way, the timing of when an edge of the time-based signal occurs is indicative of the voltage level of the voltage signal.

One or more delay circuits 24 may be configured to adjust timing of an edge of the time-based signal based on weighting factors applied to previous samples of an output digital signal (e.g., equalized communication signal) of equalizer 14 to generate a delay data signal (48). As one example, one or more delay circuits 24 are arranged to process the time-based signal in series to generate a delay data signal. Delay circuits 24 are configured to adjust the timing of when the edge of the time-based signal occurs, and a corresponding time delay introduced by each of delay circuits 24 is configured based on a respective weighting factor applied to one or more samples of an output digital signal previously generated by the TB-DFE circuit (e.g., equalizer 14A).

For example, one or more delay circuits 24 are a plurality of delay circuits 24 that are sequentially coupled to a respective next one of the delay circuits 24. Delay circuit 24A (e.g., a first delay circuit 24A of the plurality of delay circuits 24) is configured to receive the time-based signal and a first previous sample of the output digital signal weighted with a first set of weighting factors by weighting circuit 26A, generate a first temporally adjusted data signal based on the time-based signal and the first previous sample weighted with the first set of weighting factors, and output the first temporally adjusted data signal to a next delay circuit (e.g., delay circuit 24B) of the plurality of delay circuits. Delay circuit 24N (e.g., a last delay circuit 24N of the plurality of delay circuits 24) is configured to receive a second temporally adjusted data signal from a preceding delay circuit (e.g., delay circuit 24N-1) of the plurality of delay circuits and a second previous sample of the output digital signal weighted with a second set of weighting factors by weighting circuit 26N, generate the delay data signal based on the second temporally adjusted data signal and the second previous sample of the output digital signal weighted with the second set of weighting factors, and output the delay data signal to phase detector 34.

In some examples, each of the one or more delay circuits 24 includes a plurality of drive circuits (e.g., 42A-42E) that are selectively turned on or off based on the one or more previous samples (e.g., PS) of the output digital signal, and a plurality of capacitors C1-C3 that are selectively coupled to the outputs of the delay circuits based on the one or more previous samples (PS) and weighting factors (e.g., respective ones of w<5:0>) of the output digital signal to adjust the timing of when at least one of the rising edge or falling edge of respective temporally adjusted data signals occur. For example, the time-based signal is one example of a first temporally adjusted data signal, and delay circuit 24A outputs a second temporally adjusted data signal to delay circuit 24B, delay circuit 24B outputs a third temporally adjusted data signal to delay circuit 24C, and so forth. Delay circuit 24N outputs a last temporally adjusted data signal, which is the delay data signal to phase detector 34. Accordingly, a corresponding time delay introduced by each of delay circuits 24, to generate respective temporally adjusted data signals, is configured based on a respective weighting factor applied to one or more samples of an output digital signal previously generated by equalizer 14A.

In this example, the first previous sample used by delay circuit 24A is an earlier sample of the output digital signal than the second previous sample used by delay circuit 24N. For example, delay circuit 24N operates based on previous sample [n−1], which is immediately preceding sample of the output digital signal. Delay circuit 24A operates based on a sample of output digital signal that occurred before previous sample [n−1] (e.g., previous sample [n−3] in examples where there are 3-taps in equalizer 14A).

Delay circuits 24 may form a first set of delay circuits of VTC stage 18. Equalizer 14A may include a second set of delay circuits 32 of reference clock stage 20 that operate in parallel with delay circuits 24. The second set of delay circuits 32 may be configured to receive a clock signal from clock circuit 30 and generate a reference clock signal.

For example, delay circuit 32A may receive a clock signal from clock circuit 30 (50). Delay circuit 32A may be configured to adjust edges of the clock signal to generate a temporally adjusted clock signal that feeds into delay circuit 32B. Delay circuit 32B may be configured to receive the temporally adjusted clock signal from delay circuit 32A and adjust edges of the temporally adjusted clock signal to generate its own temporally adjusted clock signal, and so forth. The last delay circuit in the second set of delay circuits (e.g., delay circuit 32M in FIG. 2 or delay circuit 34 in FIG. 8) may output the reference clock signal to phase detector 34. In other words, the second set of delay circuits 32, including delay circuit 34 for the example in FIG. 8, delay the clock signal to generate a reference clock signal (52). In one or more examples, the clock signal that is delayed by reference clock stage 20 is the same clock signal used by VTC stage 18.

There may be various ways in which the second set of delay circuits 32, including delay circuit 34 of the FIG. 8 example, generate the reference clock signal. As one example, delay circuits 32, in the example of FIG. 2, generate the reference clock signal based on the clock signal and without the one or more previous samples of the output digital signal. As one example, delay circuits 32 and delay circuit 34, in the example of FIG. 8, generate the reference clock signal based on the clock signal, and at least one delay circuit (e.g., delay circuit 34) generates a temporally adjusted clock signal for the reference clock signal based on one or more of the one or more previous samples. For example, delay circuit 34 may utilize previous sample [n−1] and weighting factors to temporally adjust the temporally adjusted clocks signal received from a preceding one of delay circuits 32, as illustrated in FIG. 8. In this example, the temporally adjusted clock signal that delay circuit 34 generates is the reference clock signal.

Phase detector 34 may be configured to compare a timing of an edge of the delay data signal and an edge of the reference clock signal (54). For instance, phase detector 34 may determine whether the edge of the delay data signal occurred before or after a corresponding edge of the reference clock signal (e.g., an edge that is within one unit interval or one-half unit interval).

Phase detector 34 may generate an output digital signal based on the comparison (56). For example, if determined that the edge of the delay data signal occurred before the corresponding edge of the reference clock signal, phase detector 34 may output a logic zero. If determine that the edge of the delay data signal occurred after the corresponding edge of the reference clock signal, phase detector 34 may output a logic one. The output digital signal is substantially the same as the input digital signal without the ISI. For example, for a bit-error rate of $10^{-12}$, the output digital signal and the input digital signal may be the sample except for one bit for every $10^{12}$ bits.

Figure 15:
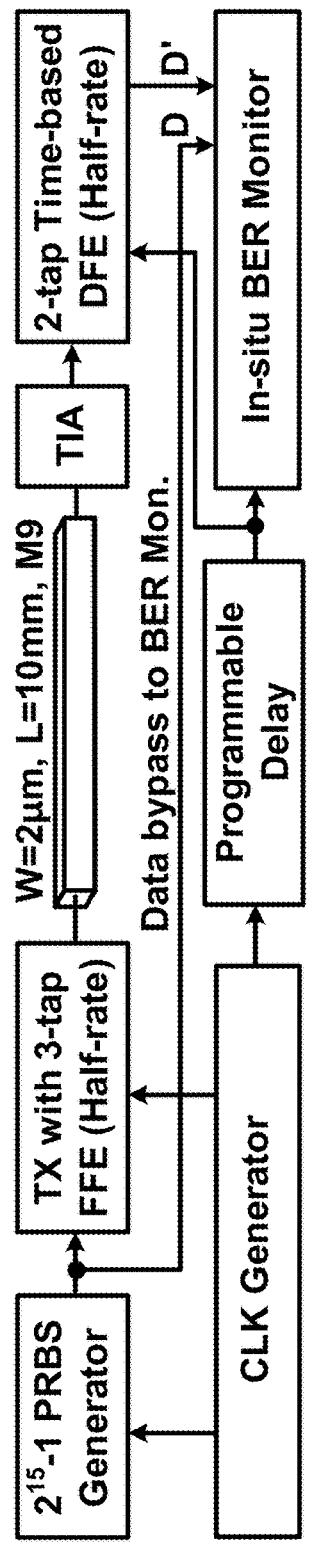
FIG. 15 is a block diagram illustrating an example test setup.

FIG. 15 is a block diagram illustrating an example test setup. FIG. 15 shows the overall block diagram of the 10 mm on-chip transceiver system implemented in a 65 nm GP process. The test chip of FIG. 15 includes an on-chip clock generator, such as clock circuit 30, which can provide a 5 GHz differential clock for TX and RX circuits (e.g., transceivers 12A, 12B). Channel data is generated by an on-chip PRBS (pseudo-random bitstream) circuit. A 3-tap half-rate FFE was implemented in the TX block to de-emphasize the output signal and transmit the data over a 10 mm by 2 μm M9 channel. 2 μm is the minimum metal width of M9 metal layer in this technology. An inverter based transimpedance amplifier (TIA) followed by a 2-tap half-rate TB-DFE (e.g., one example of the equalizer 14A includes 2-taps) was designed for the RX block. On-chip monitoring circuits for in-situ bathtub and BER eye-diagram measurements were included. A 2-tap DFE was found to be sufficient for a 10 mm channel for the target frequency. This was also verified by experimental data provided below.

Figure 16:
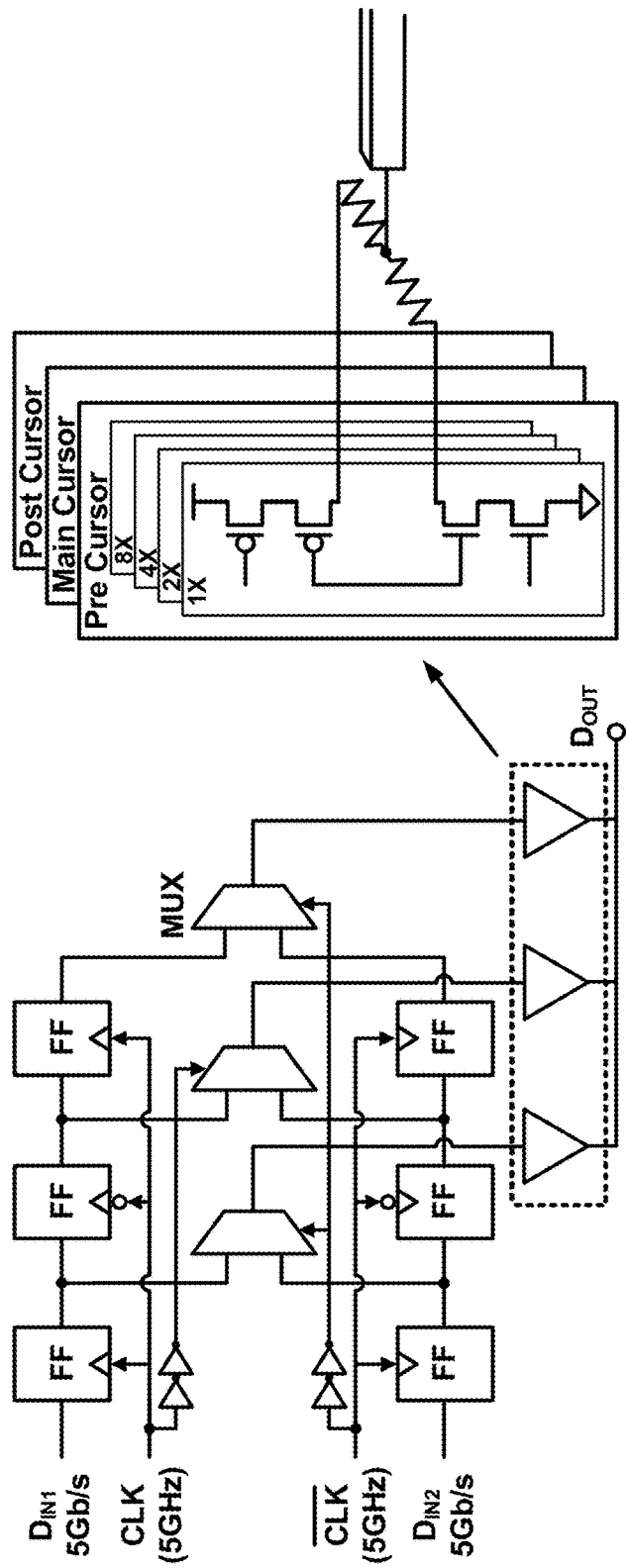
FIG. 16 is a block diagram illustrating example 3-tap half rate FFE for testing.

FIG. 16 is a block diagram illustrating example 3-tap half rate FFE for testing. FIG. 16 shows the detailed implementation of the 3-tap half rate FFE of FIG. 15. The data stream was generated by two independent PRBS units each operating at 5 Gb/s. The two bit streams were fed to two separate data paths. Different PRBS algorithms were implemented to ensure good randomness in the combined 10 Gb/s data. The differential 5 GHz clock samples the two data streams in an alternating manner achieving half-rate operation. Three flip-flops drive the per-cursor, main-cursor, and post-cursor, respectively, to support a 3-tap FFE operation. The multiplexer (MUX) after the third flip-flop stage combines the two data streams into a single 10 Gb/s data stream. A voltage mode output driver operating at 10 Gb/s is implemented using a bank of inverters and two shared output resistors for TX impedance matching. 4-bit FFE weights determine the de-emphasis level.

Figure 17:
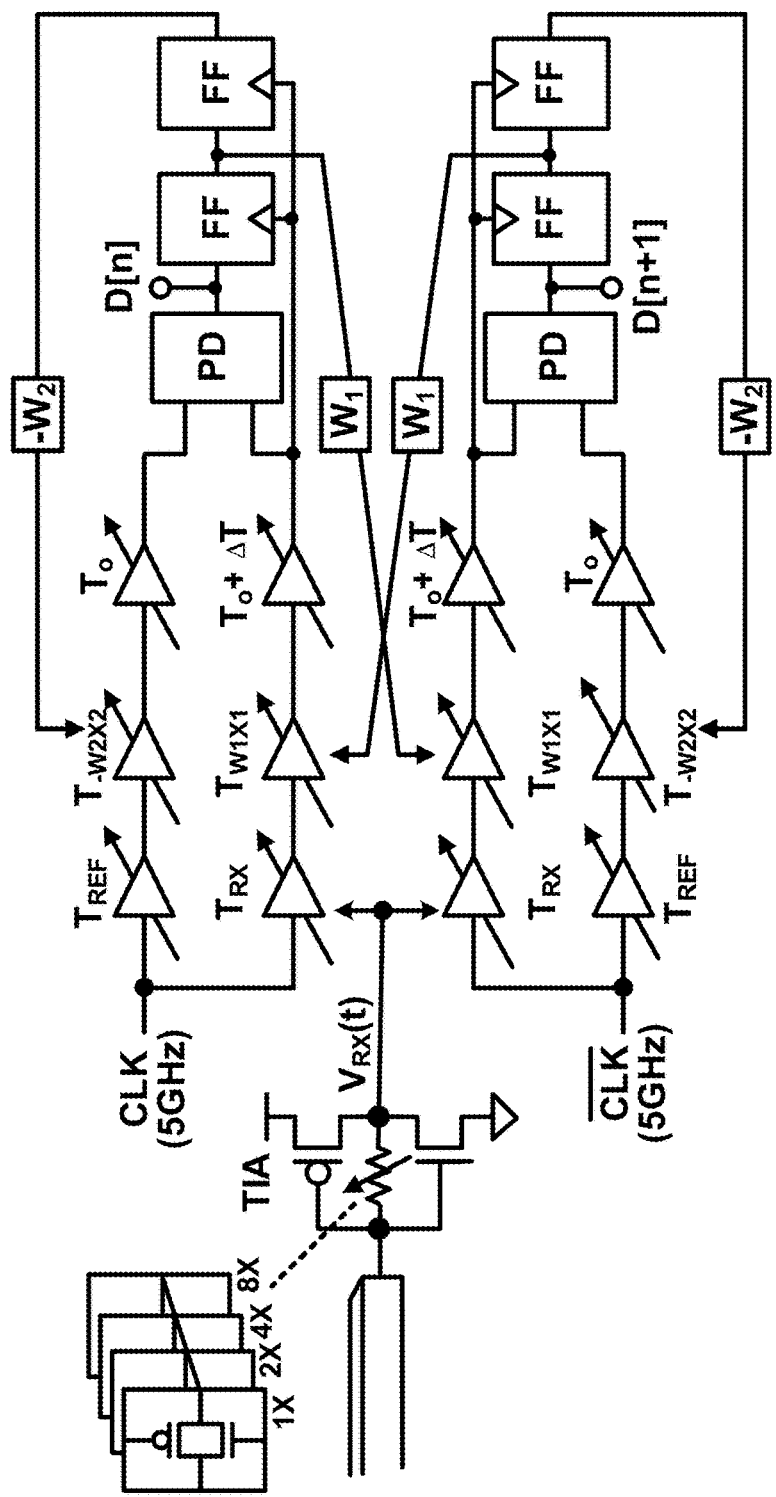
FIG. 17 is a block diagram illustrating example TIA and 2-tap half rate equalizer.

FIG. 17 is a block diagram illustrating example TIA and 2-tap half rate TB-DFE. Details of the receiver of FIG. 15 are shown in FIG. 17. An inverter based TIA with a 4-bit programmable transmission gate bank ensures good RX impedance matching. The simulated bandwidth of the TIA was 4.2-9.9 GHz depending on the transmission gate configuration. A differential 5 GHz clock drives two parallel DFE paths achieving a combined data rate of 10 Gb/s. After the TIA, the voltage signal is converted to time delay $T_{RX}$ (e.g., time-based signal) by the VTC (e.g., VTC stage 18). $T_{REF}$ (e.g., delay added by delay circuits 24) is tunable in the test chip and was fixed to roughly the average of data '1' and '0' delays. The second delay stage is a digital delay stage controlled by the feedback data and the appropriate weights. With the delay transformation technique described in FIG. 8, the second tap in VTC stage 18 can be moved to the bottom delay line (e.g., reference clock stage 20). A third programmable delay stage was added for testing purposes (i.e. eye-diagram measurements).

High-speed serial links are traditionally characterized using off-chip equipment such as bit-error-rate-tester (BERT), gigahertz clock generator, and high frequency probes/cables. High-speed serial link measurements can be easily corrupted by any non-ideal connection between the test equipment and IO pad. Ever-increasing clock frequencies and rising test costs have motivated designers to adopt on-chip BER measurement solutions. This testing approach has several advantages over off-chip equipment based testing such as simpler setup, lower cost, ease of test automation, higher resolution, and reduced noise. This is particularly true for on-chip serial links as they are embedded deeply inside a processor chip with no connection to the outside world. The test chip of FIG. 15 may include in-situ BER and eye-diagram measurement circuits as part of the 65 nm test chip.

As described above, such as with respect to FIG. 7B, one way to visualize the results of the delays is with an eye diagram. FIG. 7B is a "time domain" eye-diagram. In a typical BER eye-diagram for voltage-mode circuits, the eye-diagram is obtained by sweeping the sampling time point and the offset voltage. Such a voltage-versus-time BER eye-diagram may not apply to the TB-DFE as the voltage is immediately converted to time. Accordingly, in a time domain BER eye-diagram, rather than voltage, the delay offset is used, where the delay offset is shift from the center sampling point. For instance, as described above with respect to FIGS. 5-7B, the reference clock signal should be approximately in the center of the bit. To generate the time-domain eye-diagram, the reference clock signal may be shifted. The delay offset was implemented using a separate delay stage in the delay lines.

Figure 18:
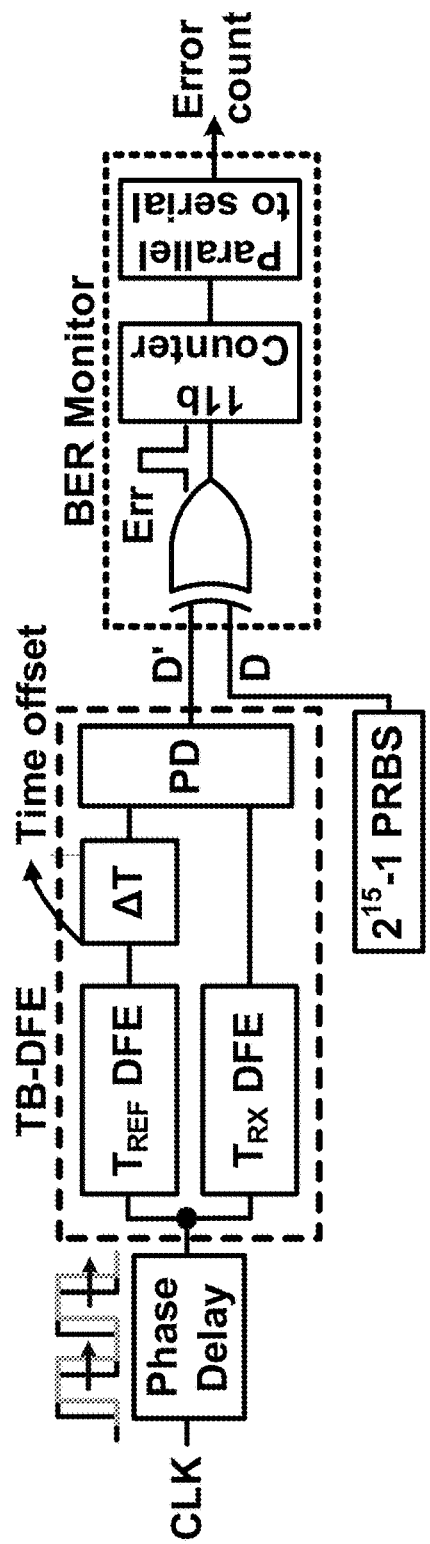
FIG. 18 is a block diagram illustrating another example test setup.

FIG. 18 is a block diagram illustrating another example test setup. For instance, the test setup for FIG. 18 may be used to generate the time-domain eye diagrams and to test the techniques described in this disclosure. FIG. 18 displays the overall block diagram of the in-situ BER and eye-diagram measurement circuit. The left most box denoted by "Phase Delay" is used to sweep the x-axis. This programmable phase delay allows the clock to sample data over a 2 unit interval (UI) range allowing BER eye measurement across two cycles. The box denoted by "ΔT", which is the third stage in the delay line, is for the delay offset representing the y-axis. Each programmable delay has a 6-bit control. The BER monitor compares the data from the $2^{15}-1$ PRBS data D with the DFE output data D' using a 2-input XOR gate. The error signal increments the 11-bit error counter. The error count is periodically read out for a given x-y configuration and the BER is computed based on the total number of cycles and the error count. By sweeping phase delay and time offset, the result is the BER bathtub and BER eye-diagram.

Figure 19:
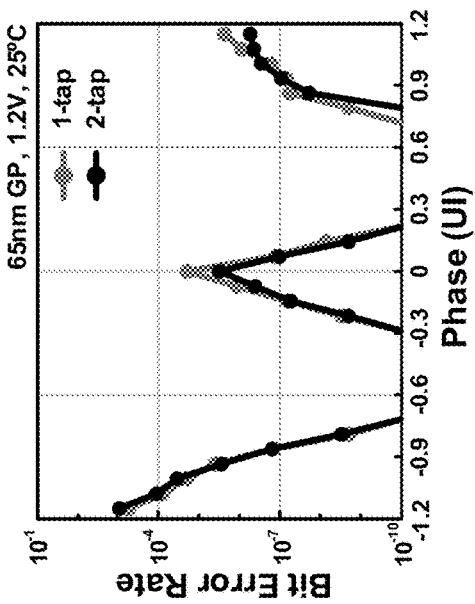
FIG. 19 is a graph illustrating measured bit-error rate (BER) for different taps of a TB-DFE circuit.

FIG. 19 is a graph illustrating measured bit-error rate (BER) for different taps of a TB-DFE circuit. FIG. 19 illustrates measured BER bathtub curves (<$10^{10}$) for 1-tap and 2-tap DFE. BER is plotted for two consecutive bits. In some cases, a 2-tap DFE offers marginal improvement in BER compared to a 1-tap DFE. For instance, FIG. 19 shows the BER bathtub while sweeping the phase delay for 1-tap and 2-tap DFE configurations. BER down to $10^{-10}$ was measured. No noticeable improvement in BER was seen by increasing the DFE length from 1-tap to 2-tap. In some examples, for the 10 mm channel implemented in the test chip and for the target frequency, a 1-tap DFE may be enough to remove ISI noise.

Figure 20:
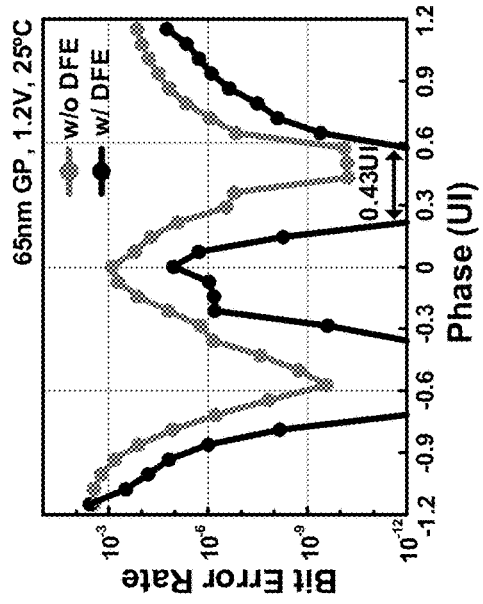
FIG. 20 is a graph illustrating measured bit-error rate (BER) with and without a TB-DFE circuit.

FIG. 20 is a graph illustrating measured bit-error rate (BER) with and without a TB-DFE circuit. In FIG. 20, the measured bit-error rate with and without a TB-DFE circuit is for two consecutive bits. FIG. 20 shows the bathtub curves with and without TB-DFE down to a BER of $10^{-12}$. Without the TB-DFE, the lowest BER that may be achieved was only $10^{-10}$. After applying the TB-DFE, a BER less than $10^{-12}$ may be achieved while maintaining an eye width of 0.43 UI.

The time offset for the BER eye-diagrams for two consecutive bits can be controlled with 6-bit precision, so 64 codes may be used. To save test time, BER down to $10^{-11}$ (not $10^{-12}$) was measured for the eye-diagram. Results show that a BER less than $10^{-11}$ was achieved for an eye width of 0.5 UI.

Figure 21:
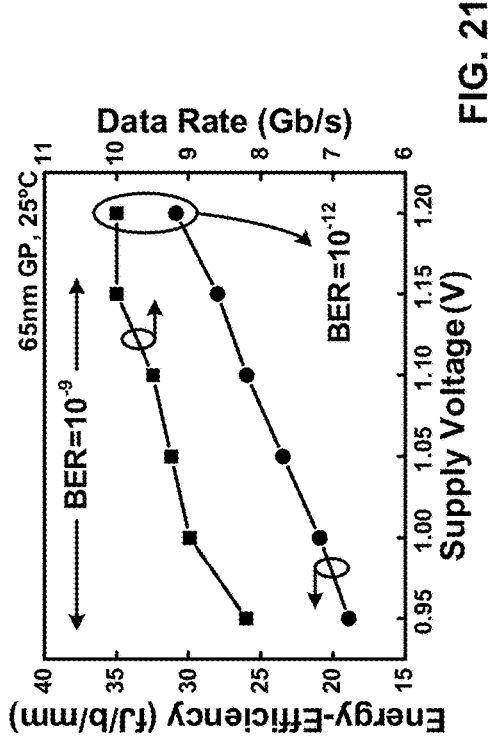
FIG. 21 is a graph illustrating energy-efficiency and data rate measured at different supply voltages.

FIG. 21 is a graph illustrating energy-efficiency and data rate measured at different supply voltages. The content of FIG. 21 is used to verify good low voltage performance of the TB-DFE (e.g., equalizer 14A). The data point at 1.2V is based on a BER criteria of $10^{-12}$ while the other data points are for a BER of $10^{-9}$ due to test time limitations.

In one example of the test chip, the transmitter and receiver blocks occupy a chip area of 23×24 μm$^2$ and 30×59 μm$^2$, respectively. The receiver area includes test circuits such as the delay offset stage, which occupies about ⅓ of the receiver circuit area, so the actual circuit area in electronic circuit 10, as one example, may be significantly smaller. The throughput per channel was 2 Gb/s/um for a data rate of 10 Gb/s and a channel length of 10 mm. The energy-efficiency of the transmitter and receiver (not including BER monitor) blocks are 31.9 and 45.3 fJ/b/mm, respectively, at 1.2V, 10 Gb/s.

TABLE 1 summarizes some of the values of the test chip.

| Technology | 65 nm GP CMOS |
|---|---|
| Core Size | TX: 23 μm × 24 μm |
|  | RX: 30 μm × 59 μm |
| VDD | 1.2 V |
| Data Rate | 10 Gb/s |
| Channel Length | 10 mm |
| BER | <$10^{-12}$ |
| Throughput | 2 Gb/s/μm |
| Energy Efficiency | TX: 31.9 fJ/b/mm |
|  | RX: 45.3 fJ/b/mm |

FIG. 22 is a table that provides comparison with previous on-chip serial links. As shown in the last column of FIG. 22, the techniques described in this disclosure are able to achieve 10 Gbps over a link length of 10 mm and a BER of less than $10^{-12}$, while consuming less power than the other processes identified in the other columns of FIG. 22.

Various aspects of the disclosure have been described. These and other examples are within the scope of the following claims.

What is claimed is:

1. A time-based decision feedback equalizer (TB-DFE) circuit comprising:
    a voltage-to-time converter configured to convert a communication signal into a time-based signal, wherein a timing of when an edge of the time-based signal occurs is indicative of a voltage level of the communication signal;
    a plurality of delay circuits arranged to process the time-based signal in series to generate a delay data signal, wherein the delay circuits are configured to adjust the timing of when the edge of the time-based signal occurs, and wherein a corresponding time delay introduced by each of the delay circuits is configured based on a respective weighting factor applied to one or more samples of an output digital signal previously generated by the TB-DFE circuit; and
    a phase detector configured to compare a timing of an edge of the delay data signal with a reference clock signal and generate the output digital signal based on the comparison.

2. The TB-DFE circuit of claim 1,
    wherein each of the plurality of delay circuits is sequentially coupled to a respective next one of the delay circuits,
    wherein a first delay circuit of the plurality of delay circuits is configured to:
        receive the time-based signal and a first previous sample of the output digital signal weighted with a first set of weighting factors;
        generate a first temporally adjusted data signal based on the time-based signal and the first previous sample weighted with the first set of weighting factors; and
        output the first temporally adjusted data signal to a next delay circuit of the plurality of delay circuits, and
    wherein a last delay circuit of the plurality of delay circuits is configured to:
        receive a second temporally adjusted data signal from a preceding delay circuit of the plurality of delay circuits and a second previous sample of the output digital signal weighted with a second set of weighting factors;
        generate the delay data signal based on the second temporally adjusted data signal and the second previous sample of the output digital signal weighted with the second set of weighting factors; and
        output the delay data signal to the phase detector.

3. The TB-DFE circuit of claim 2, wherein the first previous sample is an earlier sample of the output digital signal than the second previous sample.

4. The TB-DFE circuit of claim 1, wherein the voltage-to-time converter receives a clock signal and the communication signal, and generates the time-based signal based on the clock signal and voltage levels the communication signal.

5. The TB-DFE circuit of claim 1, wherein the delay circuits comprise a first set of delay circuits, the TB-DFE circuit further comprising:
    a second set of delay circuits configured to receive a clock signal and generate the reference clock signal.

6. The TB-DFE circuit of claim 5,
    wherein the second set of delay circuits comprise a plurality of delay circuits that are sequentially coupled to a respective next one of the second set of delay circuits,
    wherein the second set of delay circuits generate the reference clock signal based on the clock signal, and without the one or more previous samples of the output digital signal.

7. The TB-DFE circuit of claim 5,
    wherein the second set of delay circuits comprise a plurality of delay circuits that are sequentially coupled to a respective next one of the second set of delay circuits,
    wherein the second set of delay circuits generate the reference clock signal based on the clock signal, and
    wherein at least one delay circuit of the second set of delay circuits generates a temporally adjusted clock signal for the reference clock signal based on one or more of the one or more previous samples.

8. The TB-DFE circuit of claim 1, wherein each of the delay circuits includes a plurality of drive circuits that are selectively turned on or off based on the one or more previous samples of the output digital signal and weighting factors, and a plurality of capacitors that are selectively coupled to the outputs of the delay circuits based on the one or more previous samples of the output digital signal and weighting factors to adjust the timing of when an edge of respective temporally adjusted data signals occurs.

9. The TB-DFE circuit of claim 8, wherein one or more of the plurality of drive circuits comprise inverters.

10. The TB-DFE circuit of claim 1, wherein the communication signal comprises an input digital signal having inter-symbol interference (ISI), and wherein the output digital signal is an equalized communication signal and is substantially the same as the input digital signal without the ISI.

11. A method for performing time-based decision feedback equalization, the method comprising:
receiving, with a time-based decision feedback equalizer (TB-DFE) circuit, a communication signal;
converting, with the TB-DFE circuit, the communication signal into a time-based signal, wherein a timing of when an edge of the time-based signal occurs is indicative of a voltage level of the communication signal;
adjusting, with the TB-DFE circuit, the timing of when the edge of the time-based signal occurs with a plurality of delay circuits arranged to process the time-based signal in series to generate a delay data signal, wherein a corresponding time delay introduced by each of the delay circuits is configured based on a respective weighting factor applied to one or more samples of an output digital signal previously generated by the TB-DFE circuit;
comparing a timing of an edge of the delay data signal with a reference clock signal; and
generating the output digital signal based on the comparison.

12. The method of claim 11, wherein receiving comprises receiving the communication signal is an on-chip serial communication signal.

13. The method of claim 11, wherein the communication signal comprises an input digital signal having inter-symbol interference (ISI), and wherein the output digital signal is an equalized communication signal and is substantially the same as the input digital signal without the ISI.

14. The method of claim 11,
wherein each of the plurality of delay circuits is sequentially coupled to a respective next one of the delay circuits,
the method further comprising:
receiving, with a first delay circuit of the plurality of delay circuits, the time-based signal and a first previous sample of the output digital signal;
generating, with the first delay circuit of the plurality of delay circuits, a first temporally adjusted data signal based on the time-based signal and the first previous sample;
outputting, with the first delay circuit of the plurality of delay circuits, the first temporally adjusted data signal to a next delay circuit of the plurality of delay circuits;
receiving, with a last delay circuit of the plurality of delay circuits, a second temporally adjusted data signal from a preceding delay circuit of the plurality of delay circuits and a second previous sample of the output digital signal weighted with a set of weighting factors;
generating, with the last delay circuit of the plurality of delay circuits, the delay data signal based on second temporally adjusted data signal and the second previous sample of the output digital signal weighted with the set of weighting factors; and
outputting, with the last delay circuit of the plurality of delay circuits, the delay data signal to a phase detector for comparing of the timing of the edge of the delay data signal with a reference clock signal.

15. The method of claim 11, wherein the delay circuits comprise a first set of delay circuits, the method further comprising:
receiving, with a second set of delay circuits, a clock signal; and
generating, with the second set of delay circuits, the reference clock signal.

16. The method of claim 15,
wherein the second set of delay circuits comprise a plurality of delay circuits that are sequentially coupled to a respective next one of the second set of delay circuits,
the method further comprising generating the reference clock signal, with the second set of delay circuit, based on the clock signal, and without the one or more previous samples of the output digital signal.

17. The method of claim 15,
wherein the second set of delay circuits comprise a plurality of delay circuits that are sequentially coupled to a respective next one of the second set of delay circuits,
the method further comprising:
generating the reference clock signal based on the clock signal, wherein at least one delay circuit of the second set of delay circuits generates a temporally adjusted clock signal for the reference clock signal based on one or more of the one or more previous samples.

18. A circuit chip comprising:
a transmitter circuit configured to output a digital communication signal;
a serial link configured to transmit the digital communication signal from the transmitter to a receiver circuit that is on-chip with the transmitter circuit;
a time-based decision feedback equalizer (TB-DFE) circuit coupled to the serial link and configured to receive the transmitted digital communication signal as an input communication signal having inter-symbol interference (ISI) introduced by transmission over the data line, the TB-DFE circuit comprising:
a voltage-to-time converter configured to convert the input communication signal having the ISI into a time-based signal, wherein a timing of when an edge of the time-based signal occurs is indicative of a voltage level of the input communication signal having the ISI; and
a plurality of delay circuits arranged to process the time-based signal in series to generate a delay data signal, wherein the delay circuits are configured to adjust the timing of when the edge of the time-based signal occurs, and wherein a corresponding time delay introduced by each of the delay circuits is configured based on a respective weighting factor applied to one or more samples of an equalized communication signal generated by the TB-DFE circuit; and
a phase detector configured to compare a timing of an edge the delay data signal with a reference clock signal and generate, based on the comparison, the equalized communication signal, wherein the equalized communication signal is substantially similar to the transmitted digital communication signal without at least some of the ISI of the input communication signal.

19. The circuit chip of claim 18,
wherein each of the delay circuits is sequentially coupled to a respective next one of the delay circuits, wherein a first delay circuit of the plurality of delay circuits is configured to:
  receive the time-based signal and a first previous sample of the output digital signal;
  generate a first temporally adjusted data signal based on the time-based signal and the first previous sample; and
  output the first temporally adjusted data signal to a next delay circuit of the plurality of delay circuits, and
wherein a last delay circuit of the plurality of delay circuits is configured to:
  receive a second temporally adjusted data signal from a preceding delay circuit of the plurality of delay circuits and a second previous sample of the output digital signal weighted with a set of weighting factors;
  generate the delay data signal based on second temporally adjusted data signal and the second previous sample of the output digital signal weighted with the set of weighting factors; and
  output the delay data signal to the phase detector.

20. The circuit chip of claim 18, wherein the delay circuits comprise a first set of delay circuits, the TB-DFE circuit further comprising:
  a second set of delay circuits configured to receive a clock signal and generate the reference clock signal.

21. The circuit chip of claim 20,
wherein the second set of delay circuits comprise a plurality of delay circuits that are sequentially coupled to a respective next one of the second set of delay circuits,
wherein the second set of delay circuits generate the reference clock signal based on the clock signal, and
wherein at least one delay circuit of the second set of delay circuits generates a temporally adjusted clock signal for the reference clock signal based on one or more of the one or more previous samples.

* * * * *